United States Patent
Ohta et al.

(10) Patent No.: US 9,750,051 B2
(45) Date of Patent: Aug. 29, 2017

(54) WIRELESS COMMUNICATION SYSTEM AND METHOD OF WIRELESS COMMUNICATION

(71) Applicant: FUJITSU LIMITED, Kawasaki-shi, Kanagawa (JP)

(72) Inventors: Yoshiaki Ohta, Yokohama (JP); Yoshinori Tanaka, Yokohama (JP); Yoshiharu Tajima, Yokohama (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 231 days.

(21) Appl. No.: 13/961,414

(22) Filed: Aug. 7, 2013

(65) Prior Publication Data

US 2013/0322339 A1 Dec. 5, 2013

Related U.S. Application Data

(63) Continuation of application No. PCT/JP2011/052918, filed on Feb. 10, 2011.

(51) Int. Cl.
*H04W 74/08* (2009.01)
*H04L 5/00* (2006.01)
(Continued)

(52) U.S. Cl.
CPC ......... *H04W 74/0833* (2013.01); *H04L 5/001* (2013.01); *H04W 24/10* (2013.01); *H04W 72/1284* (2013.01); *H04W 74/006* (2013.01)

(58) Field of Classification Search
CPC ........... H04W 74/006; H04W 72/1284; H04W 24/10; H04W 74/0833; H04L 5/001
See application file for complete search history.

(56) References Cited

U.S. PATENT DOCUMENTS

2009/0270094 A1* 10/2009 Ito et al. ............... 455/434
2010/0113081 A1 5/2010 Ishii et al.
(Continued)

FOREIGN PATENT DOCUMENTS

CN 101568186 A 10/2009
CN 101902825 A 12/2010
(Continued)

OTHER PUBLICATIONS

International Search Report issued for corresponding International Patent Application No. PCT/JP2011/052918, mailed Mar. 8, 2011.
(Continued)

*Primary Examiner* — Ajay Cattungal
(74) *Attorney, Agent, or Firm* — Myers Wolin, LLC

(57) ABSTRACT

A wireless communication system includes a sending device and a receiving device. The sending device includes a first control unit that sends the state of a buffer by using a first wireless carrier, and a first random access management unit that manages random access performed by the sending device. The receiving device includes a second control unit that receives the state of the buffer by using the first wireless carrier and that performs a data exchange by using a second wireless carrier on the basis of the state of the buffer, and a second random access management unit that manages random access performed by the receiving device. The second random access management unit sends control information that includes a dedicated preamble that is unique to a device. The first and the second random access management units perform non-contention based random access that uses the dedicated preamble.

13 Claims, 19 Drawing Sheets

(51) Int. Cl.
  *H04W 24/10* (2009.01)
  *H04W 72/12* (2009.01)
  *H04W 74/00* (2009.01)

(56) References Cited

U.S. PATENT DOCUMENTS

| | | | |
|---|---|---|---|
| 2010/0150082 A1 | 6/2010 | Shin et al. | |
| 2010/0240372 A1* | 9/2010 | Wu | 455/436 |
| 2010/0278128 A1* | 11/2010 | Lee | H04W 74/004 370/329 |
| 2011/0038316 A1* | 2/2011 | Hatakeyama | H04L 1/1809 370/328 |
| 2011/0045863 A1* | 2/2011 | Lee | H04L 5/0007 455/517 |
| 2011/0103328 A1* | 5/2011 | Lee | H04W 74/004 370/329 |
| 2011/0249641 A1* | 10/2011 | Kwon | H04W 74/0833 370/329 |
| 2011/0292911 A1 | 12/2011 | Uemura et al. | |
| 2012/0076126 A1* | 3/2012 | Yi | H04L 5/001 370/338 |
| 2012/0113939 A1 | 5/2012 | Kim et al. | |
| 2012/0121282 A1* | 5/2012 | Oba | G03G 15/105 399/57 |
| 2013/0010716 A1* | 1/2013 | Dinan | H04W 76/025 370/329 |
| 2013/0064165 A1* | 3/2013 | Chen | H04W 56/0045 370/312 |
| 2013/0242938 A1* | 9/2013 | Dinan | H04W 72/042 370/330 |
| 2013/0272241 A1* | 10/2013 | Ohta | H04W 74/006 370/329 |

FOREIGN PATENT DOCUMENTS

| | | |
|---|---|---|
| JP | 2009-267759 | 11/2009 |
| JP | 2010-220214 | 9/2010 |
| JP | 2010-263629 | 11/2010 |
| WO | 2008/096789 | 8/2008 |
| WO | 2010/082521 | 7/2010 |
| WO | 2011/005011 A2 | 1/2011 |

OTHER PUBLICATIONS

Fujitsu; "RACH for connected mode in carrier aggregation"; Agenda Item: 7.1.9; 3GPP TSG-RAN WG2 Meeting #69; R2-101541; San Francisco, USA; Feb. 22-26, 2010.

3GPP TS 36.300 V10.0.0; 3rd Generation Partnership Project; Technical Specification Group Radio Access Network; Evolved Universal Terrestrial Radio Access (E-UTRA) and Evolved Universal Terrestrial Radio Access Network (E-UTRA); "Overall description; Stage 2 (Release 10)"; Jun. 2010.

3GPP TS 36.321 V9.3.0; 3rd Generation Partnership Project; Technical Specification Group Radio Access Network; Evolved Universal Terrestrial Radio Access (E-UTRA); "Medium Access Control (MAC) protocol specification (Release 9)"; Jun. 2010.

Notice of Rejection issued for corresponding Japanese Patent Application No. 2012-556722, mailed on Dec. 10, 2013, with an English translation.

Fujitsu, "On RACH selection freedom", Agenda Item: 7.1.1.8, Apr. 12-16, 2010, R2-102163, 3GPP TSG-RAN WG2 Meeting #69bis, Beijing, China.

First Notification of Office Action issued for corresponding Chinese Patent Application No. 201180067233.8 issued on Nov. 2, 2015 with an English translation.

Extended European search report with the supplementary European search report and the European search opinion issued for corresponding European Patent Application No. 11858196.6 dated Apr. 13, 2016.

The 2nd Notification of Office Action issued for corresponding Chinese Patent Application No. 201180067233.8 issued Mar. 23, 2016 with an English translation.

* cited by examiner

WIRELESS COMMUNICATION SYSTEM AND METHOD OF WIRELESS COMMUNICATION

CROSS-REFERENCE TO RELATED APPLICATION

This application is a continuation of International Application No. PCT/JP2011/052918, filed on Feb. 10, 2011 and designating the U.S., the entire contents of which are incorporated herein by reference.

FIELD

The embodiments discussed herein are related to a wireless communication system and a method of wireless communication.

BACKGROUND

A method of sending data by using a random access is used as one of conventional wireless communication methods. For example, in a mobile unit communication system, when uplink data is generated, a mobile station performs a random access procedure by using a physical random access channel (PRACH) and requests uplink transmission grant from a base station. With random access, contention occurs if multiple mobile stations send the same shared preamble ID on the same PRACH. If contention occurs, the base station is not able to detect a mobile station that has performed the random access. Hereinafter, such random access will be referred to as contention-based random access.

In the following, the conventional operation of the contention-based random access will be briefly described. For example, if uplink data is generated, the mobile station notifies, by using a PRACH, the base station of an Msg1 that contains a randomly selected shared preamble ID. At this point, if multiple mobile stations send the same shared preamble ID by using the same PRACH, contention occurs. Then, by using an Msg2, the base station sends back a response to the Msg1 together with a synchronization signal, transmission grant, and the like that are used for uplink communication. Then, the mobile station acquires the uplink synchronization timing from the Msg2. The mobile station then sends its own identifier and the like by using an Msg3. If the base station detects the identifier of the mobile station, the base station sends an Msg4 to that mobile station, thus resolving the contention. Then, the mobile station starts to exchange data with the base station after exchanging the Msg1 to Msg4. As for the examples of the conventional technologies, see 3GPP TS36.300, "Evolved Universal Terrestrial Radio Access (E-UTRA) and Evolved Universal Terrestrial Radio Access Network (E-UTRAN)", V10.0.0, Release 10, June 2010, and 3GPP TS36.321, "Medium Access Control (MAC) protocol specification", V9.3.0, Release 9, June 2010, for example.

However, with the contention-based random access described above, the time period (Msg1 to Msg4) taken to perform synchronization is about 25 ms, which is a problem in that it is a significant loss of time.

SUMMARY

According to an aspect of an embodiment of the present invention, a wireless communication system performs wireless communication by using multiple wireless carriers. The wireless communication system includes a sending device and a receiving device. The sending device includes a first control unit and a first random access management unit. The first control unit sends the state of a buffer by using a first wireless carrier. The first random access management unit manages random access performed by the sending device. The receiving device includes a second control unit and a second random access management unit. The second control unit receives the state of the buffer by using the first wireless carrier and that performs a data exchange by using a second wireless carrier on the basis of the state of the buffer. The second random access management unit manages random access performed by the receiving device. When the second control unit performs the data exchange by using the second wireless carrier, the second random access management unit sends control information that includes a dedicated preamble that is unique to a device. As a trigger when the control information is exchanged, the first and the second random access management units perform, by using the second wireless carrier, non-contention based random access that uses the dedicated preamble.

According to another aspect of an embodiment of the present invention, a receiving device receives data by using multiple wireless carriers. The receiving device includes a control unit and a random access management unit. The control unit receives the state of a buffer from a sending device by using a first wireless carrier and performs a data exchange by using a second wireless carrier on the basis of the state of the buffer. The random access management unit sends, when the control unit performs the data exchange by using a second wireless carrier, control information that includes a dedicated preamble that is unique to a device.

According to still another aspect of an embodiment of the present invention, a sending device sends data by using multiple wireless carriers. The sending device includes a control unit and a random access management unit. The control unit sends the state of a buffer by using a first wireless carrier. The random access management unit manages random access performed by the sending device. As a trigger when the control information is received, when a receiving device performs a data exchange by using a second wireless carrier on the basis of the state of the buffer and sends control information that includes a dedicated preamble that is unique to a device, the random access management unit performs, by using the second wireless carrier, non-contention based random access that uses the dedicated preamble.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The present invention is not limited by the embodiments.

[a] First Embodiment

Figure 1:
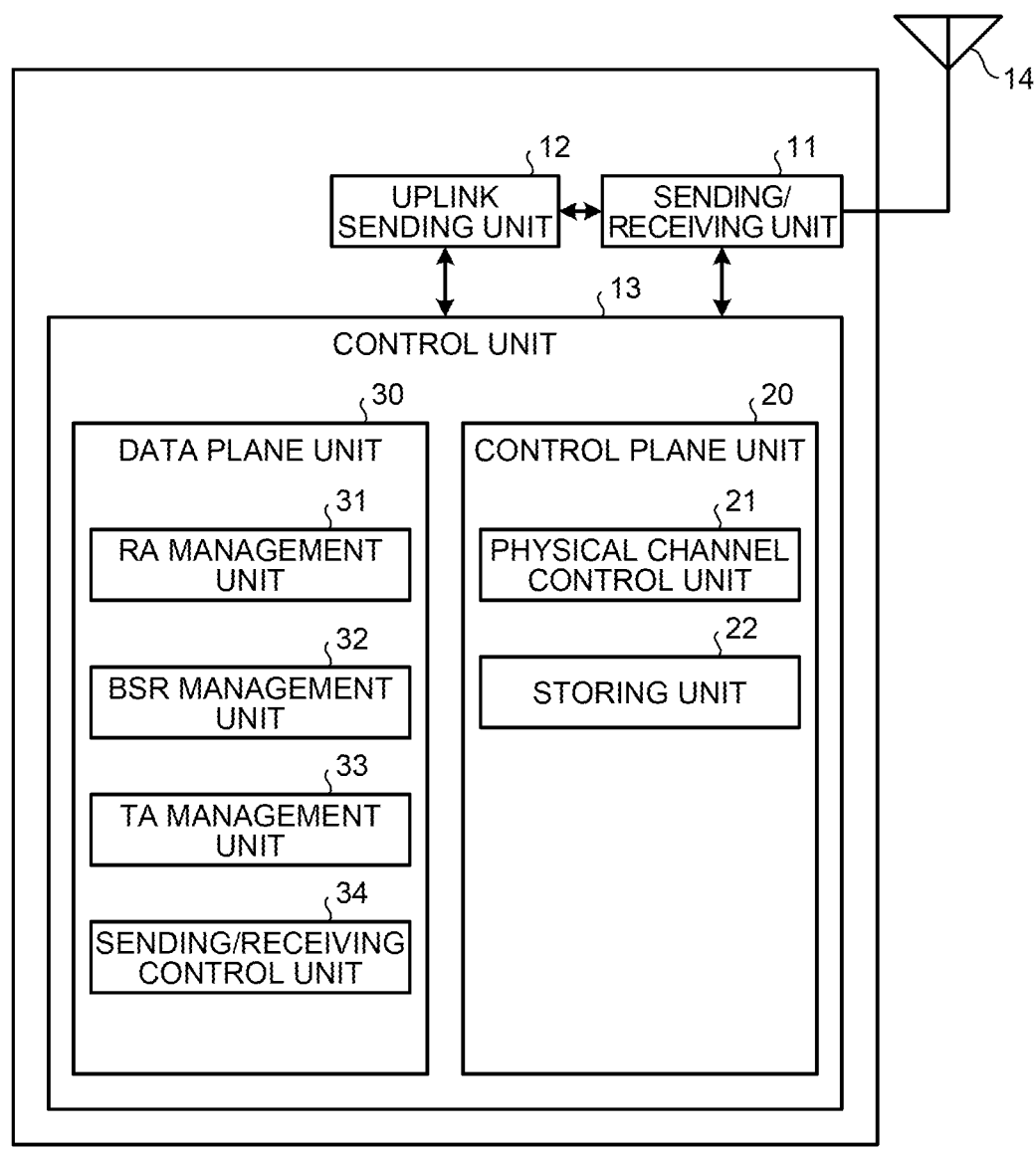
FIG. 1 is a schematic diagram illustrating an example configuration of a mobile station (sending device) in a wireless communication system according to a first embodiment.
Figure 2:
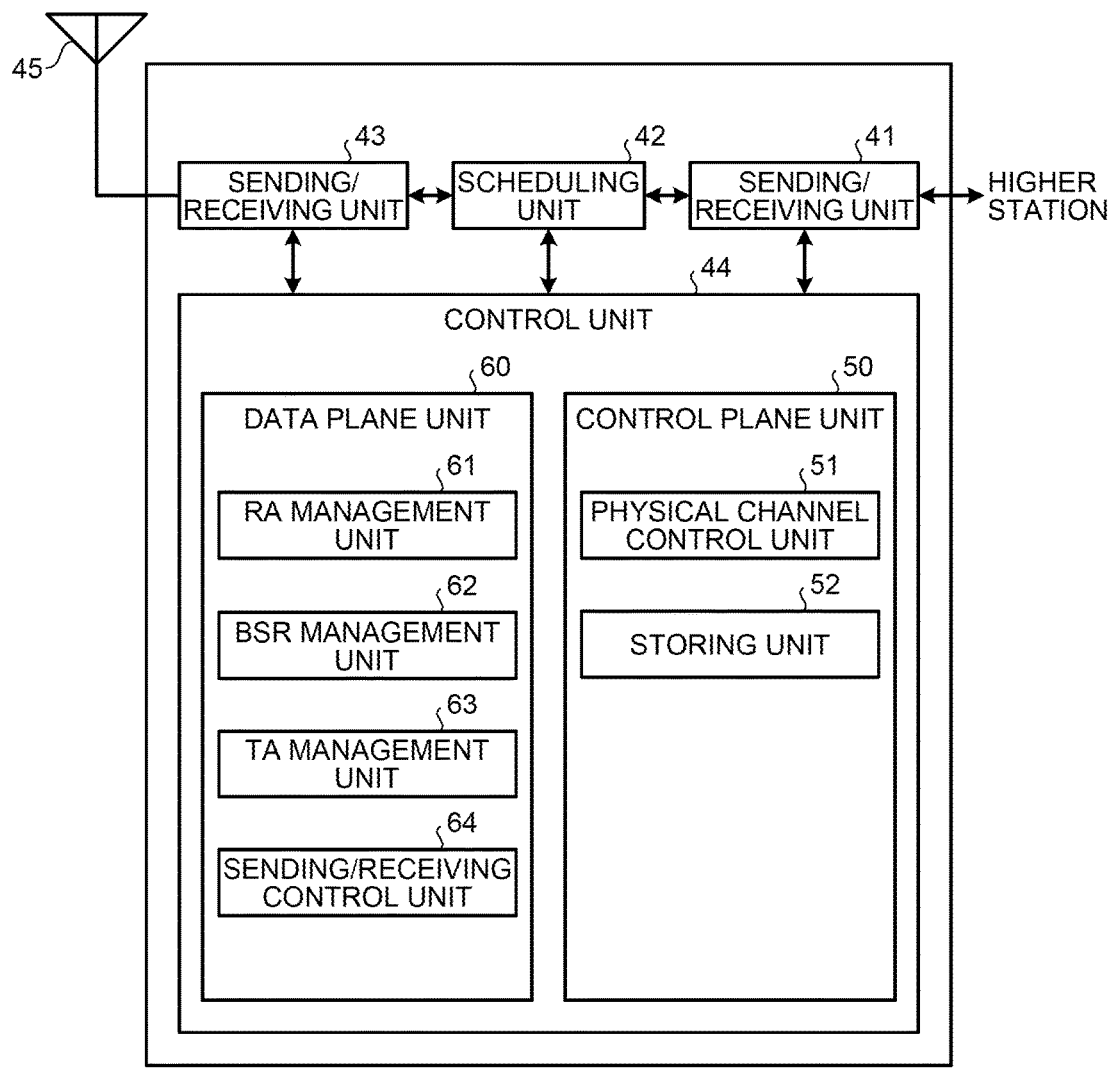
FIG. 2 is a schematic diagram illustrating an example configuration of a base station (receiving device) in the wireless communication system according to the first embodiment.

FIG. 1 is a schematic diagram illustrating an example configuration of a mobile station (sending device) in a wireless communication system. FIG. 2 is a schematic diagram illustrating an example configuration of a base station (receiving device) in the wireless communication system.

In FIG. 1, the mobile station includes a sending/receiving unit 11, an uplink sending unit 12, a control unit 13, which includes a control plane unit 20 and a data plane unit 30, and an antenna 14. The sending/receiving unit 11 sends and receives a wirelessly transmitted signal via the antenna 14. The uplink sending unit 12 performs, under the control of the control unit 13, a transmission process on uplink data (data, an acknowledgment response (ACK/NACK), and the like).

The control plane unit 20 in the control unit 13 is a Radio Resource Control (RRC) layer and controls all the layers. Specifically, the control plane unit 20 includes a physical channel control unit 21 and a storing unit 22. The physical channel control unit 21 performs a timing control and a resource control on, for example, a Physical Uplink Shared Channel (PUSCH), a Physical Uplink Control Channel (PUCCH), and a PRACH. The storing unit 22 stores therein the parameter T that indicates the time period from when the base station receives a Buffer Status Reporting (BSR) until it sends the Msg0.

Furthermore, the data plane unit 30 in the control unit 13 controls the following layers: the Physical (PHY) layer, the Media Access Control (MAC) layer, the Radio Link Control (RLC) layer, and the Packet Data Convergence Protocol (PDCP) layer. Specifically, the data plane unit 30 includes a random access (RA) management unit 31, a BSR management unit 32, a timing adjustment (TA) management unit 33, and a sending/receiving control unit 34. The RA management unit 31 controls a process related to random access. The BSR management unit 32 controls a process related to the BSR transmission. The TA management unit 33 manages uplink synchronization timing. The sending/receiving control unit 34 controls the sending and receiving of data and an acknowledgment response (ACK/NACK).

In contrast, in FIG. 2, the base station includes a sending/receiving unit 41, a scheduling unit 42, a sending/receiving unit 43, a control unit 44, which includes a control plane unit 50 and a data plane unit 60, and an antenna 45. The sending/receiving unit 41 exchanges data with a higher station. The scheduling unit 42 schedules wireless transmission. The sending/receiving unit 43 sends and receives a wirelessly transmitted signal via the antenna 45.

The control plane unit 50 in the control unit 44 is the RRC layer and controls all the layers. Specifically, the control plane unit 50 includes a physical channel control unit 51 and a storing unit 52. The physical channel control unit 51 performs timing control and resource control of, for example, a PUSCH, a PUCCH, and a PRACH. The storing unit 52 stores therein the parameter T that indicates the time period from when the storing unit 52 receives the BSR until it sends the Msg0.

The data plane unit 60 in the control unit 44 controls the following layers: the PHY layer, the MAC layer, the RLC layer, and the PDCP layer. Specifically, the data plane unit 60 includes an RA management unit 61, a BSR management unit 62, a TA management unit 63, and a sending/receiving control unit 64. The RA management unit 61 controls the process related to a random access method. The BSR management unit 62 controls the process related to the receiving of the BSR. The TA management unit 63 manages uplink synchronization timing. The sending/receiving control unit 64 controls the sending and receiving of data, an acknowledgment response (ACK/NACK), and the like.

In the first embodiment, a description will be given, as an example, of the wireless communication method used by a wireless communication system that includes a mobile station (sending device) and a base station (receiving device); however, the relationship between the sending device and the receiving device is not limited thereto. For example, the wireless communication method according to the first embodiment may also be used in a system that includes a relay station (sending device) and a base station (receiving device) or a system that includes a mobile station (sending device) and a relay station (receiving device). Furthermore, in the example configuration of the mobile station and the base station described above, for convenience of description, components (functioning units) related to the processes according to the first embodiment are described but a description of all of the functions performed by the mobile station and the base station is not given. Furthermore, the functioning units in the mobile station and the base station can be constructed from, for example, a central processing unit (CPU), a field programmable gate array (FPGA), and a memory.

In the following, before describing the wireless communication method in the wireless communication system according to the first embodiment, a description will be given of the underlying wireless communication method and system.

In the Long Term Evolution (LTE) standard, which is a standard for next-generation mobile communication systems, a method based on orthogonal frequency division multiplexing (OFDM) is prescribed as a radio access technology. The LTE enables high speed wireless packet communication in which the peak transmission rate in a downlink is equal to or greater than 100 Mb/s and the peak transmission rate in an uplink is equal to or greater than 50 Mb/s. At present, in the 3rd Generation Partnership Project (3GPP), which is an international standards organization, research that is part of the mobile communication system LTE-A (LTE-Advanced), which is based on the LTE, has started to implement faster high-speed communication. In the LTE-A, various new technologies, such as a wireless access method and a network architecture, are being investigated in order to implement the peak transmission rate of 1 Gb/s in a downlink and that of 500 Mb/s in an uplink.

Figure 3:
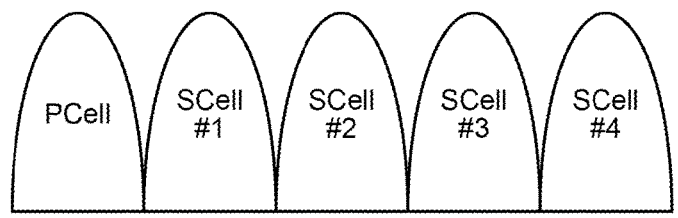
FIG. 3 is a schematic diagram illustrating carrier aggregation.
Figure 4:
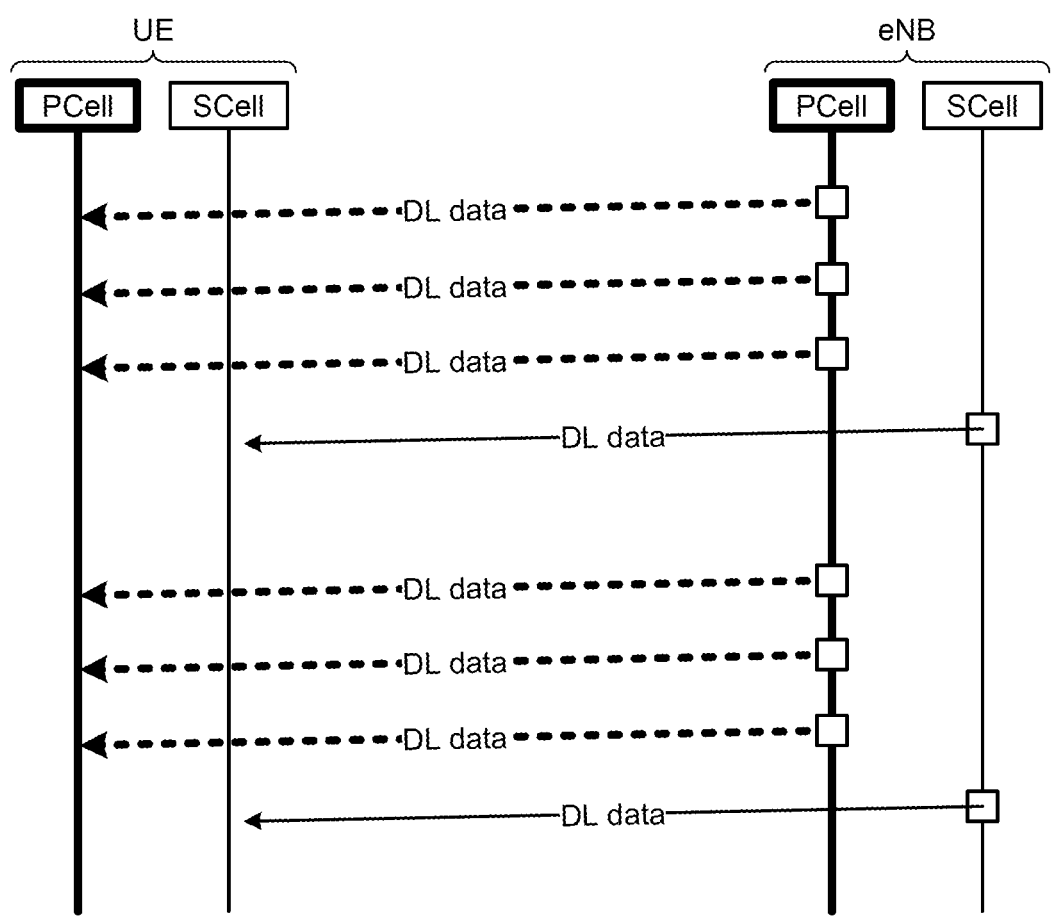
FIG. 4 is a schematic diagram illustrating data exchange in a wireless communication system that uses carrier aggregation.

In the LTE-A (or LTE Rel-10), as a method of implementing high-speed communication, research has been conducted on a wireless communication method in which multiple wireless carriers in the LTE system are aggregated and larger volume of data is transmitted by using these aggregated bands. This method is called carrier aggregation (frequency aggregation). FIG. 3 illustrates carrier aggregation. In FIG. 3, the LTE wireless carriers that are aggregated are referred to as component carriers. Furthermore, in the carrier aggregation, a cell that performs various important controls (e.g., transmission of uplink control data) is referred to as a Primary Cell (PCell). Furthermore, cells (#1 to #4) that can be aggregated are referred to as Secondary Cells (SCells) and are additional carriers used to improve the throughput. FIG. 4 is a schematic diagram illustrating data exchange in a wireless communication system that uses carrier aggregation. In the LTE-A and the like, for example, a mobile station (UE) and a base station (eNB) exchange data (corresponding to the downlink (DL) data in the drawing) by using multiple component carriers.

Figure 5:
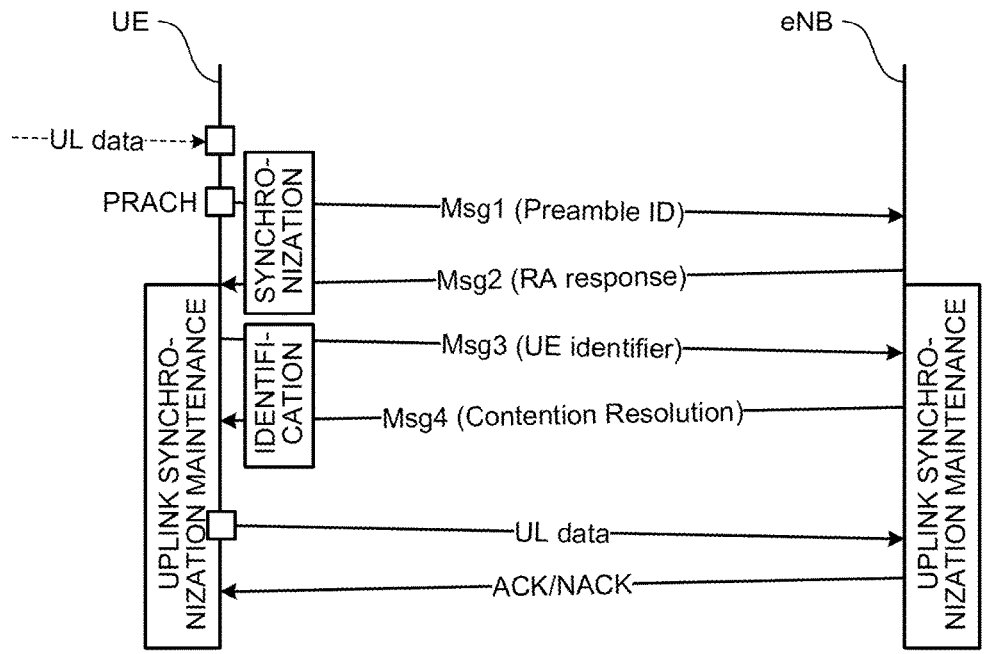
FIG. 5 is a schematic diagram illustrating an example of a contention-based random access procedure.

Furthermore, as the underlying technology of the wireless communication method according to the first embodiment, in the LTE-A and the like, a contention-based random access procedure is prescribed. For example, when uplink data (UL data) is generated, if the resource of a scheduling request is not allocated, a mobile station performs a contention-based random access and requests uplink transmission grant from a base station. FIG. 5 is a schematic diagram illustrating an example of a contention-based random access procedure.

Specifically, first, a mobile station sends, by using an Msg1, a preamble ID that is randomly selected. At this point, there may be a case in which multiple mobile stations send the same preamble ID by using the same PRACH. In such a case, contention occurs. Even if the contention has occurred, because the base station is not able to recognize, at this point an identifier of a valid mobile station, the base station does not identify mobile stations in which contention of the preamble ID has occurred. Then, by using an Msg2, the base station sends back a response (RA response) with respect to the Msg1 together with a synchronization signal or transmission grant that are used for uplink communication. If multiple mobile stations send the Msg1 at the same time, the Msg2 is sent back to these mobile stations. The mobile station acquires the uplink synchronization timing by using the Msg2. Then, by using an Msg3, the mobile station sends its own identifier (UE identifier). If the base station receives the Msg3, the base station can recognize the identifier of that mobile station. Consequently, if multiple mobile stations send the same preamble ID by using different PRACHs, the base station can recognize mobile stations in which contention of the preamble ID has occurred. In contrast, if multiple mobile stations send the same preamble ID by using the same PRACH, for example, only the mobile station having a high received power is detected. Thereafter, by sending an Msg4 to the detected mobile station, the base station performs contention resolution. Specifically, in this contention-based random access procedure, synchronization of devices is maintained in the Msg1 and the Msg2 (uplink synchronization maintenance) and a mobile station is recognized in the Msg3 and the Msg4.

Then, after the completion of "synchronization maintenance" and "mobile station recognition" of the Msg1 to the Msg4, the mobile station starts a data exchange (UL data and ACK/NACK) with the base station. For the Msg2, a reception time is determined. The values of the reception times are 2, 3, 4, 5, 6, 7, 8, and 10 and the units thereof are subframes. For example, if a value is set to 2, the mobile station continuously monitors the Msg2 starting two consecutive subframes after three subframes counted from the subframe that is subsequent to the subframe that has sent the Msg1. Furthermore, for the Msg4, a reception time is also determined. The values of the reception times are 8, 16, 24, 32, 40, 48, 56, and 64. For example, if a value is set to 8, the mobile station continuously monitors the Msg4 starting at a subframe that is a maximum of eight consecutive subframes from the maximum counted from the subframe that has sent the Msg3.

Figure 6:
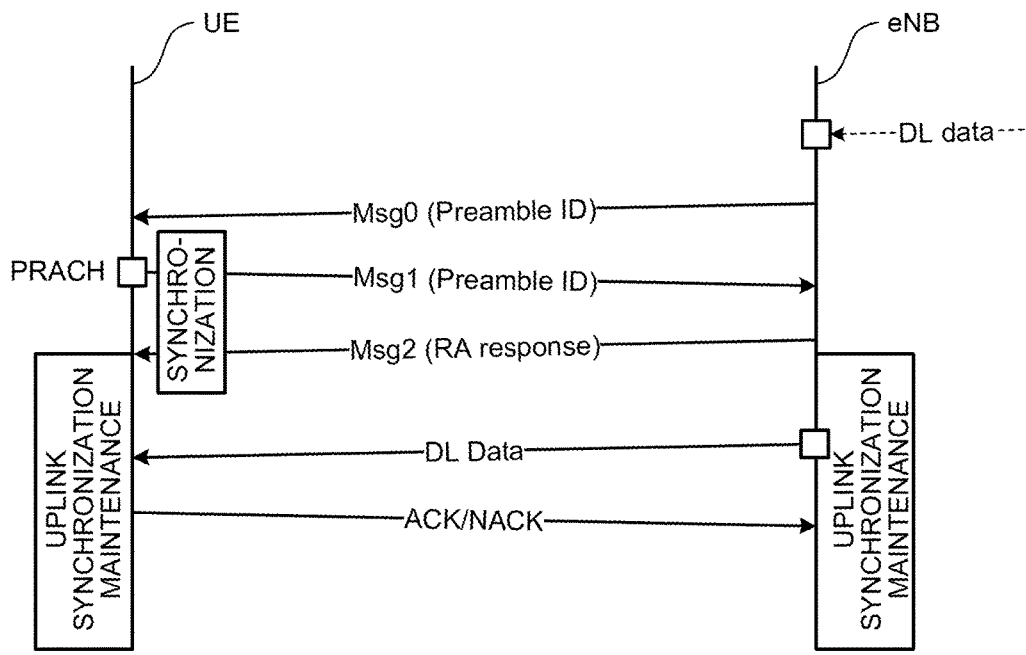
FIG. 6 is a schematic diagram illustrating an example of a non-contention based random access procedure.

Furthermore, in the LTE-A and the like, in addition to the contention-based random access procedure described above, a non-contention based random access (Contention-free Random Access) method is prescribed. For example, if downlink data (DL data) that is to be sent to a specific mobile station is generated and if uplink synchronization with respect to that mobile station has not been performed, a base station allows the mobile station to perform the non-contention based random access in order to reserve the uplink synchronization. FIG. 6 is a schematic diagram illustrating an example of a non-contention based random access procedure.

Specifically, first, the base station allocates, by using the Msg0, a dedicated preamble ID to the above described specific mobile station. Then, the mobile station starts a random access by using the Msg1 and using the allocated dedicated preamble ID. Then, by using the Msg2, the base station sends back a response to the Msg1 together with a synchronization signal or transmission grant that is used for uplink communication. The mobile station acquires the uplink synchronization timing by using the Msg2. In this non-contention based random access procedure, the synchronization between the devices are maintained (uplink synchronization maintenance) in the Msg1 and the Msg2.

Then, after performing the "synchronization maintenance" using the Msg1 and the Msg2, the base station starts to send and receive (DL data and ACK/NACK) data to/from the mobile station.

In the non-contention based random access procedure described above, there may be a case in which the number of dedicated preamble IDs that are used in the Msg0 is insufficient. This may occur when, for example, many mobile stations perform handovers in a cell of a base station. In a handover, a dedicated preamble ID is allocated by using the Msg0, random access is performed at handover destination base station, and uplink synchronization timing is immediately maintained. Consequently, if a lot of mobile stations perform handovers, a lot of dedicated preamble IDs are used. In such a case, because the base station is not able to allow a mobile station to perform the non-contention based random access due to the insufficiency of the number of dedicated preamble IDs, the base station sends, by using the Msg0, an empty preamble ID (specifically, "000000"). The mobile station that received the Msg0 performs the contention-based random access. At this point, it is determined that the Msg1 sends data by using a PRACH that is the closest to the subframe that received the Msg0.

Figure 7:
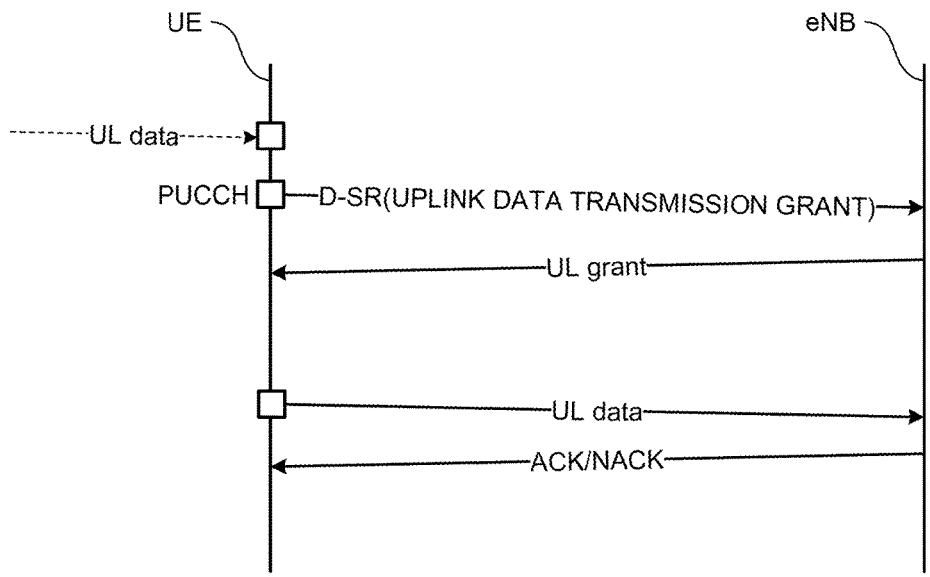
FIG. 7 is a schematic diagram illustrating an example of a scheduling request procedure.

Furthermore, in the LTE-A and the like, as the underlying technology of the wireless communication method according to the first embodiment, a scheduling request procedure is prescribed. For example, if uplink data (UL data) is generated in a mobile station, and if the resource of a scheduling request is allocated and the uplink synchronization is maintained, the mobile station requests uplink data to be sent by using the scheduling request procedure. FIG. 7 is a schematic diagram illustrating an example of a scheduling request procedure. A higher layer is used for allocating the resource (the allocation of subframe that is allowed to send an "SR PUCCH" and the allocation of the radio resource to be used).

Specifically, the mobile station sends a scheduling request message (D-SR), i.e., uplink data transmission grant, by using the specified radio resource at the specified subframe timing. Unlike the contention-based random access described above, because the base station that has received the D-SR can identify the mobile station that sent the D-SR, the base station sends back an uplink transmission grant message (UL grant) to that mobile station. After receiving the UL grant, the mobile station performs the uplink data transmission (UL data and ACK/NACK).

When the base station receives the D-SR, the base station does not always send back the UL grant to the mobile station (not prescribed in the specification). Accordingly, if the mobile station is not able to receive the UL grant from the base station, then, by using the specified transmission timing and resource of the D-SR, the mobile station repeatedly sends the D-SR until the mobile station receives the UL grant. The number of D-SRs that can be sent is prescribed by the parameter (a count value) named SR_COUNTER and dsr-TransMax, which is the maximum value of the parameter. The maximum value is configured by the base station. Specifically, "SR_COUNTER<dsr-TransMax" is satisfied, the mobile station continue to send a D-SR. In contrast, if "SR_COUNTERdsr-TransMax" is satisfied, because the mobile station is not able to send a D-SR due to the excessive number of times a transmission is accepted, the mobile station requests the uplink data to be sent by changing the procedure to the above-described contention-based random access.

Furthermore, in the carrier aggregation, a PUCCH exists in a PCell. The reason for this is that the PUCCH resource is valuable. Consequently, the scheduling request procedure described above is also performed in the PCell.

Furthermore, a rule is set for properly using the random access procedure and the scheduling request procedure. Specifically, if an "SR PUCCH" is not allocated to a mobile station, the mobile station requests the uplink data to be sent by using the contention-based random access procedure. In contrast, if an "SR PUCCH" is allocated, the mobile station requests the uplink data to be sent first by using the scheduling request procedure. Then, if the uplink transmission grant is not received from a base station within the number of prescribed times (transmission of the D-SR), the mobile station changes to the contention-based random access procedure for requesting the uplink data to be sent. In other words, the random access procedure and the scheduling request procedure are exclusively performed and they are not simultaneously performed.

Figure 8:
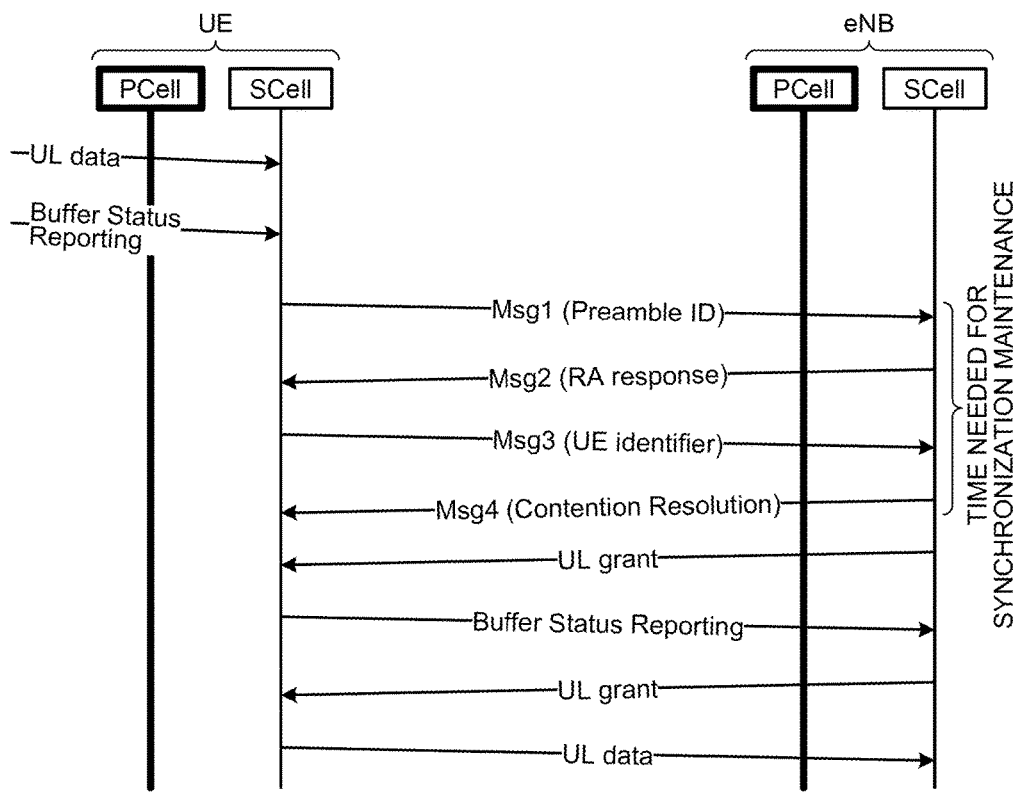
FIG. 8 is a schematic diagram illustrating an example of a contention-based random access procedure performed in an SCell.

Furthermore, as the underlying technology of the wireless communication method according to the first embodiment, lastly, a description will be given of a case in which, in the carrier aggregation, the contention-based random access procedure is performed in an SCell. FIG. 8 is a schematic diagram illustrating an example of a contention-based random access procedure performed in an SCell. In this example, it is assumed that synchronization is not maintained in an SCell and thus a contention-based random access is performed to reserve synchronization.

For example, if uplink data is generated and if a trigger of a buffer volume report using a BSR is generated, the mobile station sends the Msg1 that includes a randomly selected preamble ID via a PRACH that is configured in the SCell. Then, the base station sends back, by using the Msg2, a response (RA response) to the Msg1 together with a synchronization signal or transmission grant that are used for uplink communication. Then, the mobile station sends, by using the Msg3, its own identifier (UE identifier) and the like. Then, the base station performs resolution of the contention (Contention Resolution) by using the Msg4. In this way, if the contention-based random access procedure is performed in the SCell, synchronization between the devices is maintained (uplink synchronization maintenance) in the Msg1 and the Msg2 and the mobile station is identified in the Msg3 and the Msg4. In the description below, the time period from when the Msg1 is sent until the Msg4 is received is referred to as the "time taken for synchronization maintenance".

Then, the base station sends an uplink transmission grant message (UL grant) to the mobile station. The mobile station that received this message sends the BSR by using the PUSCH that is configured in the SCell. Then, if the base station determines from the BSR being received that an SCell needs to be added, the base station sends back the uplink transmission grant message (UL grant) to the mobile station. After receiving the UL grant, the mobile station starts to send and receive data (UL data) to/from the base station in the SCell.

However, as described above, in the carrier aggregation, if the contention-based random access procedure is performed in an SCell, the time (the Msg1 to the Msg4) taken to reserve synchronization is about 25 ms. Furthermore, because uplink transmission grant needs to be obtained after the synchronization is maintained, an additional time of about 10 ms is taken to send uplink data. Specifically, there is a total delay time of about 35 ms from when the uplink data is generated until the uplink data is sent.

Accordingly, in the embodiment, in order to implement high-speed communication, the design of the random access procedure (wireless communication method) in an SCell is improved.

Figure 9:
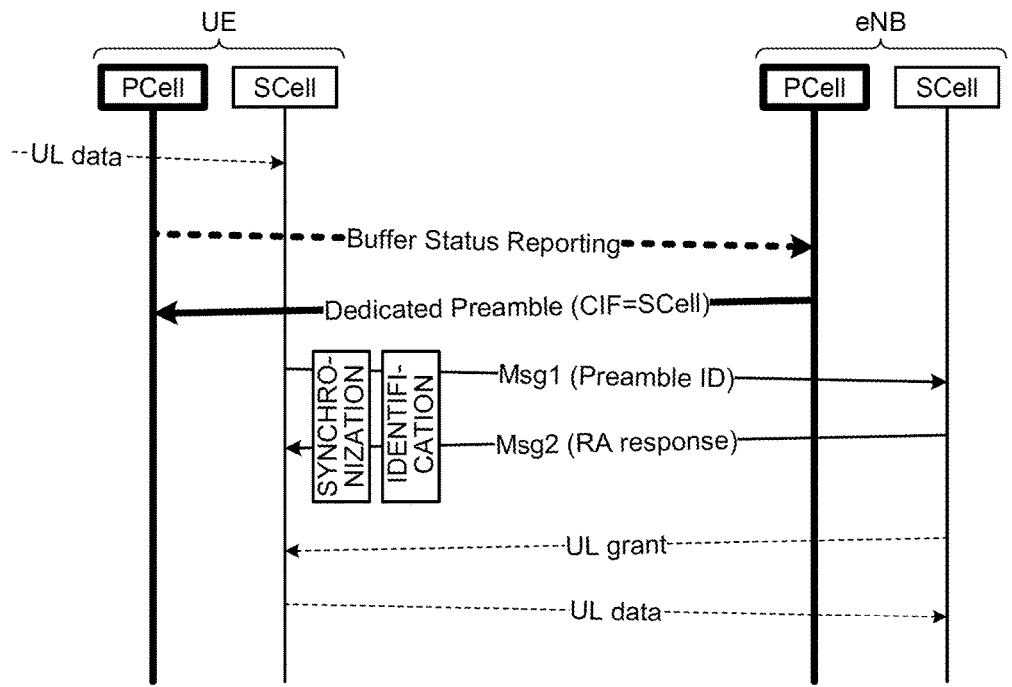
FIG. 9 is a schematic diagram illustrating an example of a wireless communication method according to a first embodiment.

In the following, the wireless communication method according to the first embodiment will be described. FIG. 9 is a schematic diagram illustrating an example of a wireless communication method according to the first embodiment. In the first embodiment, a base station and a mobile station perform non-contention based random access that is triggered when, if uplink data is generated, a BSR is sent by the mobile station. In the embodiment, it is assumed that, in a PCell, uplink synchronization is maintained and the uplink transmission resource is allocated. Furthermore, in the embodiment, it is assumed that, in an SCell, uplink synchronization is not maintained.

In FIG. 9, if uplink data is generated and if the trigger of a buffer volume report using a BSR is generated, the mobile station sends the BSR via the PUSCH that is configured in the PCell. For example, if a periodic BSR is configured, the base station provides, at an appropriate timing, the mobile station with a UL grant that is used to report a BSR at a periodic timing. Consequently, the mobile station can report the volume of its own buffer to the base station at the provided periodic timing.

Then, on the basis of the BSR (the volume of the buffer to be reported) received from the mobile station, the base station determines whether an SCell needs to be added. Specifically, the base station determines whether the amount of data in the uplink buffer in the mobile station is large. If it is determined that the amount of data in the uplink buffer is large and thus it is determined that an SCell needs to be added, the base station sends the Msg0 (Dedicated Preamble) including a dedicated preamble ID to the mobile station via the PDCCH that is configured in the PCell. In the Msg0, a carrier indicator field (CIF) is configured in which a cell identifier of a cell that sends the Msg1 is specified. Specifically, in the Msg0, an SCell that is used to send the Msg1 is specified. Consequently, the base station can allow the mobile station to perform non-contention based random access by using the specified SCell.

Thereafter, if the mobile station receives the Msg0 in the PCell, the mobile station starts non-contention based random access and sends, by using the dedicated preamble ID allocated by using the Msg0, the Msg1 (Preamble ID) via the PRACH that is configured in the specified SCell.

Then, by using the Msg2, the base station sends back a response (RA response) to the Msg1 together with a synchronization signal or transmission grant that are used for uplink communication. The mobile station acquires uplink synchronization timing by using the Msg2. In the wireless communication method in the embodiment, by sending and receiving the Msg1 and the Msg2 described above, the synchronization of SCells between the devices is maintained (uplink synchronization maintenance).

Furthermore, after sending the Msg2, the base station sends an uplink transmission grant message (UL grant) to the mobile station by using the SCell. The mobile station performs the "synchronization maintenance" in the Msg1 and the Msg2. After receiving the UL grant in the SCell, the mobile station starts, in the SCell, to exchange data (UL data) with the base station.

As described above, in the wireless communication method according to the embodiment, if uplink data is generated, the mobile station sends a BSR. In response to the report of the BSR, if the base station determines that an SCell needs to be added, the base station and the mobile station perform non-contention based random access. Consequently, it is possible to omit the Msg3 and the Msg4 used by the conventional contention-based random access, thus implementing high-speed uplink transmission.

Figure 10:
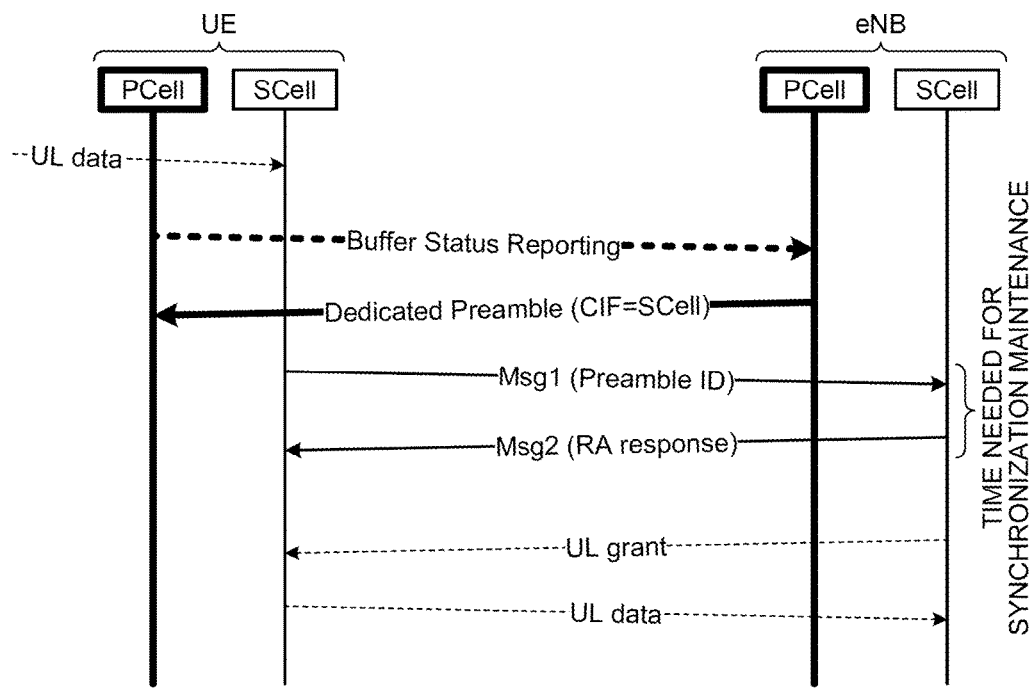
FIG. 10 is a schematic diagram illustrating the effect of the wireless communication method according to the first embodiment.

FIG. 10 is a schematic diagram illustrating the effect of the wireless communication method according to the first embodiment. With the wireless communication method according to the embodiment, the time needed for the synchronization maintenance can be reduced to about 12 ms, whereas it takes about 25 ms in the process illustrated FIG. 8.

Figure 11:
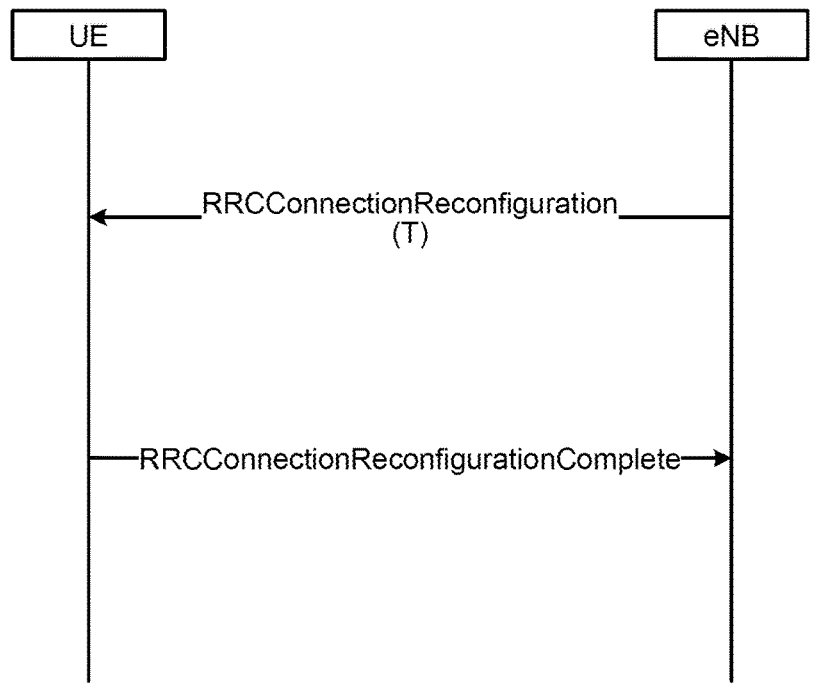
FIG. 11 is a schematic diagram illustrating an example of the dedicated signaling that is used to send a value of the parameter T to the mobile station.
Figure 12:
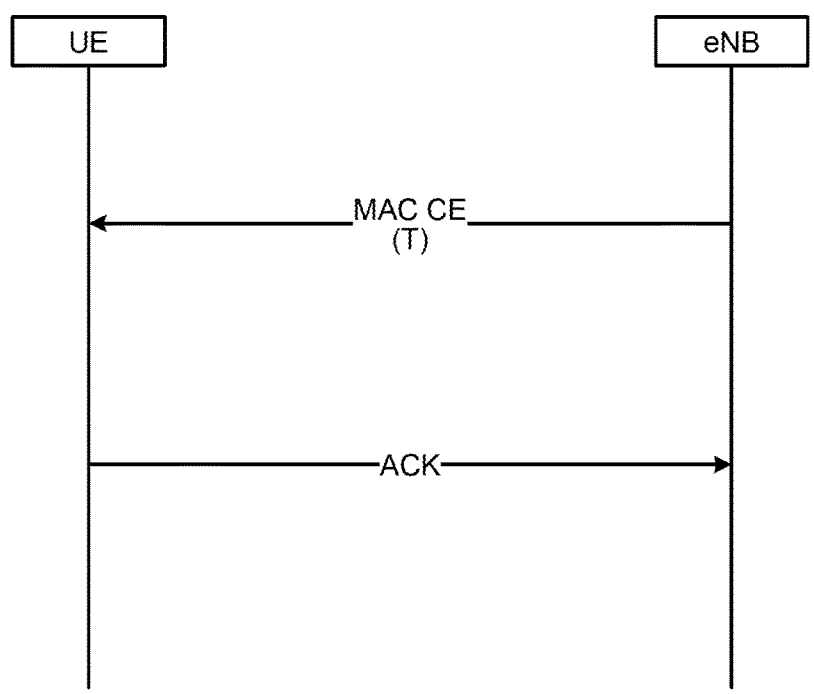
FIG. 12 is a schematic diagram illustrating an example of the dedicated signaling that is used to send a value of the parameter T to the mobile station.

In the wireless communication method in the embodiment, the time period (the range of transmission timing) from when the base station receives a BSR until it sends the Msg0 can be defined as the parameter T. The value of the parameter T is, for example, the number of subframes, where a subframe is used as a unit. In the embodiment, as an example, before the base station starts data communication, the base station notifies the mobile station of the value of the parameter T by using dedicated signaling. FIG. 11 is a schematic diagram illustrating an example of the dedicated signaling described above. At this point, the base station notifies the mobile station of the value of the parameter T by using "RRC Connection Reconfiguration" that is sent and received when communication is started. Then, the mobile station sends back "RRC Connection Reconfiguration Complete" as a response thereto. FIG. 12 is a schematic diagram illustrating another example of the dedicated signaling described above. In this example, the base station notifies the mobile station of the value of the parameter T by using "MAC Control Element". Then, the mobile station sends back an ACK as a response.

Furthermore, the parameter T may also be determined each time using a scheduling algorithm of the base station or may also be uniquely determined by the system (uniquely prescribed in the specification).

Furthermore, in the wireless communication method according to the embodiment, the description has been given of a case in which a base station and a mobile station performs the non-contention based random access. However, when the Msg0 is sent, if the number of allocatable dedicated preamble IDs is insufficient and thus a dedicated preamble ID is not able to be allocated to a mobile station, the base station sends an empty preamble ID (specifically, "000000") by using the Msg0. In such a case, because the mobile station that has received the Msg0 is not able to receive a dedicated preamble ID, the mobile station performs the contention-based random access illustrated in FIG. 5 to perform uplink transmission.

Figure 13:
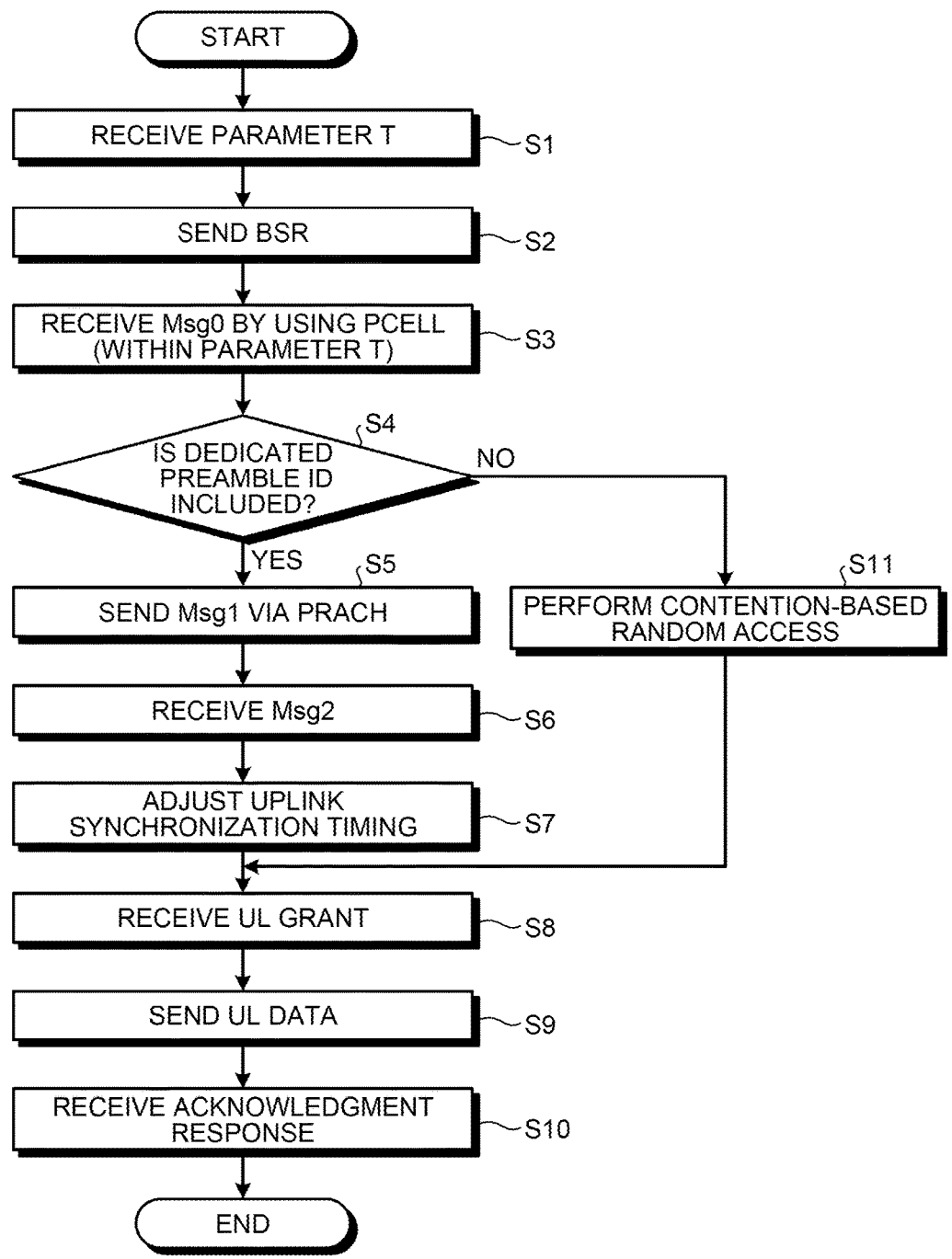
FIG. 13 is a flowchart illustrating the operation of the mobile station (sending device) that sends UL data.
Figure 14:
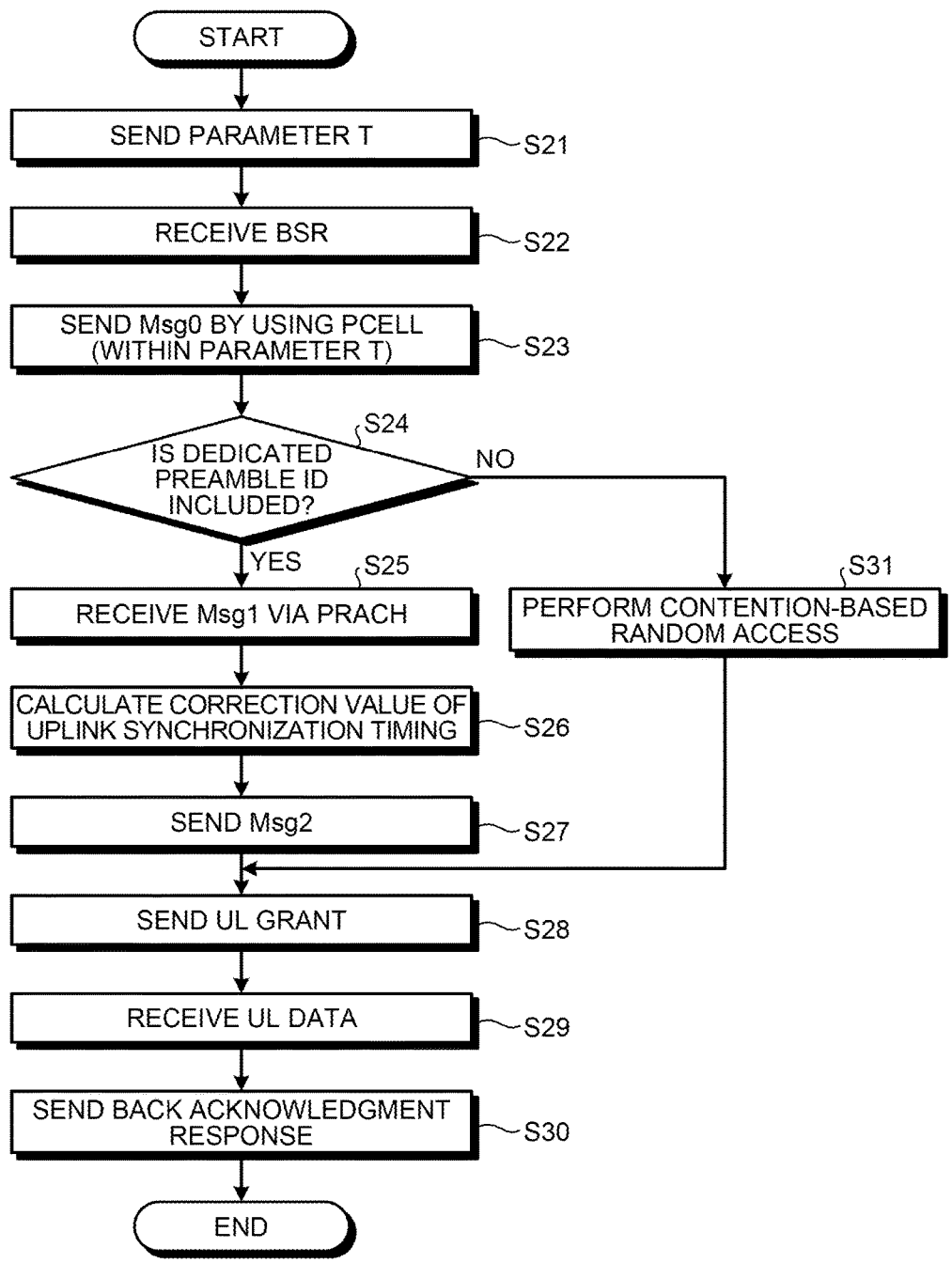
FIG. 14 is a flowchart illustrating the operation of the base station (receiving device) that receives the UL data.

In the following, the operation of the base station and the mobile station that implement the wireless communication method according to the first embodiment will be described in accordance with a flowchart. FIG. 13 is a flowchart illustrating the operation of the mobile station (sending device) that sends UL data. FIG. 14 is a flowchart illustrating the operation of the base station (receiving device) that receives the UL data. In the embodiment, it is assumed that uplink synchronization is not maintained in an SCell.

The operation of the mobile station will be described with reference to FIG. 13. First, the sending/receiving control unit 34 receives, via the sending/receiving unit 11, the parameter T that is sent through the "RRC Connection Reconfiguration" and then stores the parameter T in the storing unit 22 (Step S1). Then, if UL data is generated, the BSR management unit 32 sends, via the uplink sending unit 12 and the sending/receiving unit 11, a BSR via the PUSCH that is configured in the PCell (Step S2). Although not illustrated because it is assumed that the uplink synchronization of the SCell is not maintained, in practice, the TA management unit 33 determines whether uplink synchronization of the SCell is maintained at a predetermined timing before sending the BSR.

Then, the RA management unit 31 receives, via the sending/receiving unit 11, the Msg0 via the PDCCH that is configured in the PCell (Step S3). At this point, the RA management unit 31 receives, within the parameter T, the Msg0 in which the CIF is configured. Then, the RA management unit 31 determines whether a dedicated preamble ID is included in the received Msg0 (Step S4). For example, if a dedicated preamble ID is not included (No at Step S4), the RA management unit 31 performs the contention-based random access illustrated in FIG. 5 (Step S11). In contrast, if a dedicated preamble ID is included (Yes at Step S4), the RA management unit 31 sends the Msg1 via the PRACH that is configured in the SCell specified by the CIF via the uplink sending unit 12 and the sending/receiving unit 11 (Step S5). The case in which the "dedicated preamble ID is not included" mentioned above means a case in which the preamble ID "000000" is included.

Then, the RA management unit 31 receives the Msg2 by using the SCell via the sending/receiving unit 11 (Step S6). Then, the TA management unit 33 adjusts the uplink synchronization timing on the basis of the Msg2 received by the RA management unit 31 (Step S7).

Furthermore, after the RA management unit 31 has received the Msg2, the sending/receiving control unit 34 receives a UL grant in the SCell via the sending/receiving unit 11 (Step S8). Then, the sending/receiving control unit 34 sends the UL data by using the SCell via the uplink sending unit 12 and the sending/receiving unit 11 (Step S9) and then receives an acknowledgment response (ACK/NACK) in the SCell as a response thereto (Step S10).

In the following, the operation of the base station will be described with reference to FIG. 14. First, the sending/receiving control unit 64 reads the parameter T that is previously stored in the storing unit 52 and sends the parameter T by using the "RRC Connection Reconfiguration" via the sending/receiving unit 43 (Step S21). If UL data is generated in the mobile station, the BSR management unit 62 receives a BSR via the PUSCH, which is configured in the PCell, via the sending/receiving unit 43 (Step S22).

If the BSR management unit 62 determines, on the basis of the BSR, that an SCell needs to be added, the RA management unit 61 sends the Msg0 via the PDCCH, which is configured in the PCell, via the sending/receiving unit 43 (Step S23). At this point, the RA management unit 61 sends, within the parameter T, the Msg0 in which the CIF is configured. Then, the RA management unit 61 checks whether a dedicated preamble ID is included in the Msg0 (Step S24). For example, if the Msg0 has been sent without including a dedicated preamble ID (No at Step S24), the RA management unit 61 performs the contention-based random access illustrated in FIG. 5 (Step S31). In contrast, if the Msg0 that includes a dedicated preamble ID has been sent (Yes at Step S24), the RA management unit 61 receives the Msg1 that is sent via the PRACH that is configured in the SCell via the sending/receiving unit 43 (Step S25). The case in which the Msg0 has been sent "without including the dedicated preamble ID" mentioned above means a case in which the Msg0 that includes the preamble ID "000000" has been sent.

Then, the TA management unit 63 calculates a value of the uplink synchronization timing correction with respect to the mobile station that has sent the Msg1 (Step S26). Then, the RA management unit 61 sends the Msg2 that includes the value of the uplink synchronization timing correction by using the SCell via the sending/receiving unit 43 (Step S27).

Furthermore, after the RA management unit 61 sends the Msg2, the sending/receiving control unit 64 sends a UL grant by using the SCell via the sending/receiving unit 43 (Step S28). Then, the sending/receiving control unit 64 receives the UL data in the SCell via the sending/receiving unit 43 (Step S29) and then sends back an acknowledgment response (ACK/NACK) by using the SCell (Step S30).

In the processes performed at Steps S1 and S21 described above by using the flowcharts, the parameter T is sent and received using the "RRC Connection Reconfiguration"; however the method is not limited thereto. For example, the parameter T may also be sent and received by using the "MAC Control Element".

As described above, in the first embodiment, if uplink data is generated, the mobile station sends a BSR, and, if the base station determines that an SCell needs to be added in response to receive the report of the BSR, the base station and the mobile station perform non-contention based random access. Accordingly, the Msg3 and the Msg4 can be omitted when compared with a case in which uplink transmission is performed by using contention-based random access; therefore, the time needed for the synchronization maintenance can be reduced. Consequently, high-speed communication can be implemented in the entirety of the system.

Figure 15:
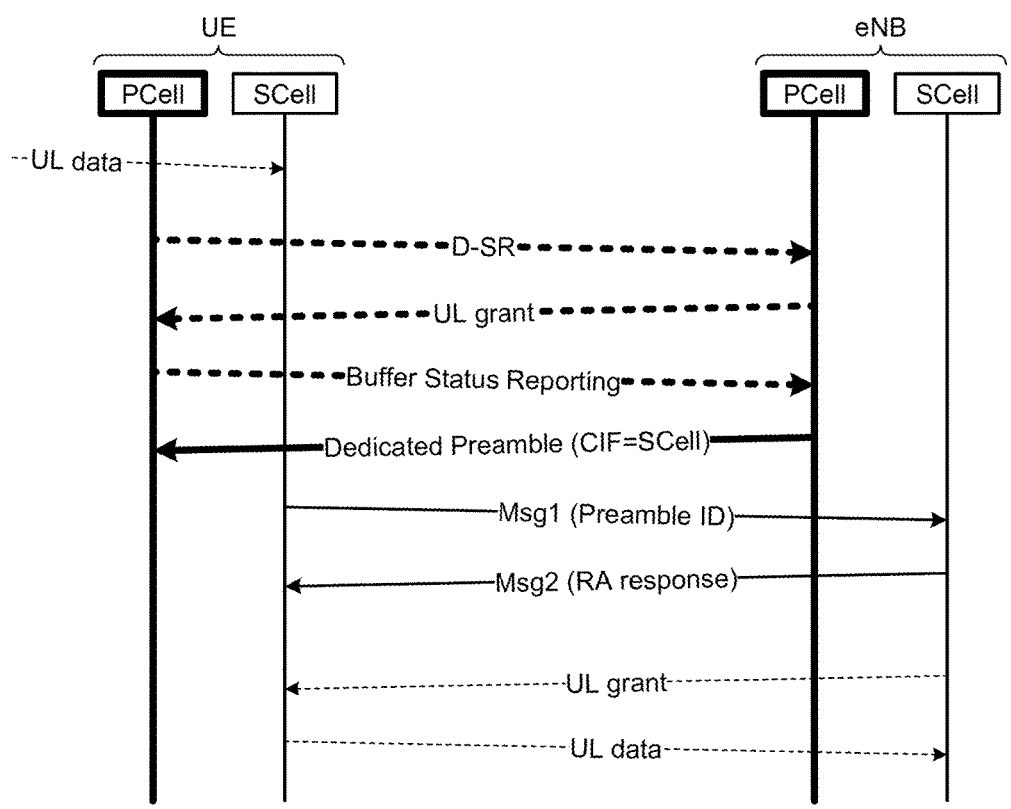
FIG. 15 is a schematic diagram illustrating an example of the wireless communication method used when uplink transmission resource is not allocated to a PCell.

In the first embodiment, a description has been given with the assumption that, in the PCell, the uplink synchronization is maintained and the uplink transmission resource is allocated; however, the configuration is not limited thereto. The wireless communication method according to the embodiment may also be implemented when the uplink transmission resource is not allocated. FIG. 15 is a schematic diagram illustrating an example of the wireless communication method used when the uplink transmission resource is not allocated to a PCell. As illustrated in FIG. 15, by sending a D-SR, which is a request for uplink data transmission grant, via the PUCCH that is configured in the PCell, the mobile station notifies the base station that uplink data is generated. Then, the base station that received the D-SR sends back an uplink transmission grant message (UL grant) to the mobile station by using the PCell. Consequently, the mobile station can perform the wireless communication method illustrated in FIG. 9, which is triggered when the UL grant is received. This operation is used when, for example, uplink data with high priority is generated.

Figure 16:
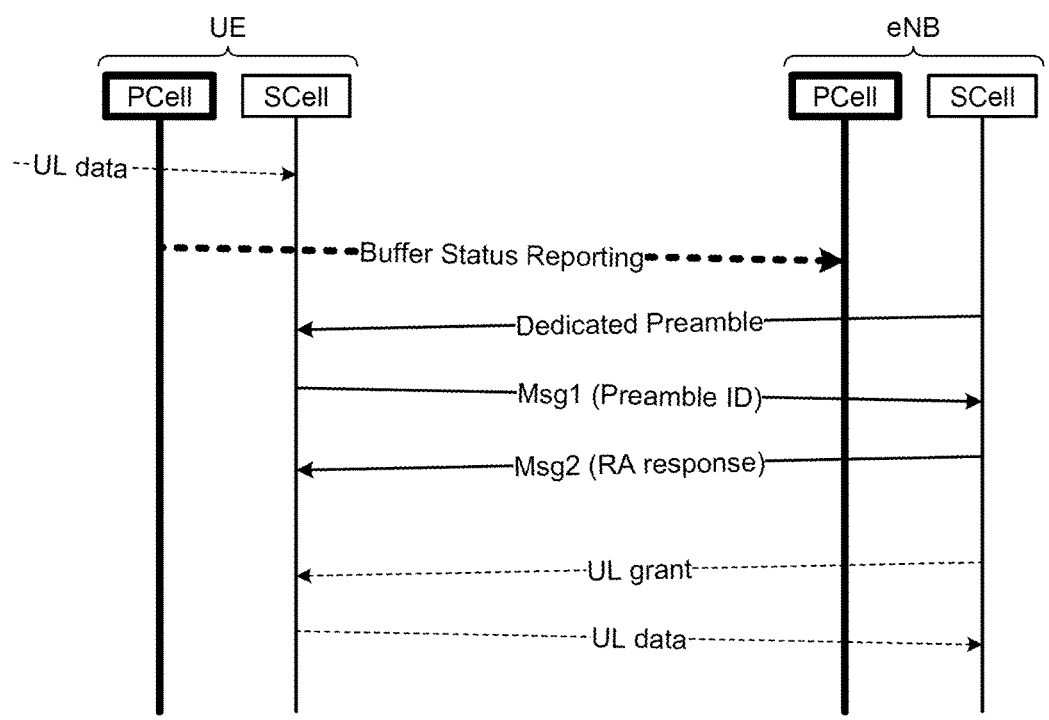
FIG. 16 is a schematic diagram illustrating the wireless communication method used when an Msg0 is sent from an SCell.

Furthermore, in the embodiment, the Msg0 (Dedicated Preamble) that includes a dedicated preamble ID is sent to the mobile station via the PDCCH that is configured in the PCell; however, the configuration is not limited thereto. For example, the Msg0 may also be sent by using the SCell. FIG. 16 is a schematic diagram illustrating the wireless communication method used when an Msg0 is sent by using the SCell. As illustrated in FIG. 16, if the base station determines, on the basis of the BSR received from the mobile station, that an SCell needs to be added, the base station sends the Msg0 (Dedicated Preamble) including a dedicated preamble ID by using the SCell that is added. At this point, because the Msg0 is sent using the SCell, the CIF does not need to be sent. Furthermore, after sending the BSR, the mobile station makes the state of the SCell active in order to receive the Msg0 in the SCell. Consequently, the mobile station can implement the non-contention based random access in the SCell that received the Msg0.

[b] Second Embodiment

In the following, a wireless communication method according to a second embodiment will be described. In the second embodiment, a description will be given with the assumption that, in the wireless communication method according to the first embodiment, the number of dedicated preamble IDs is running short.

Figure 17:
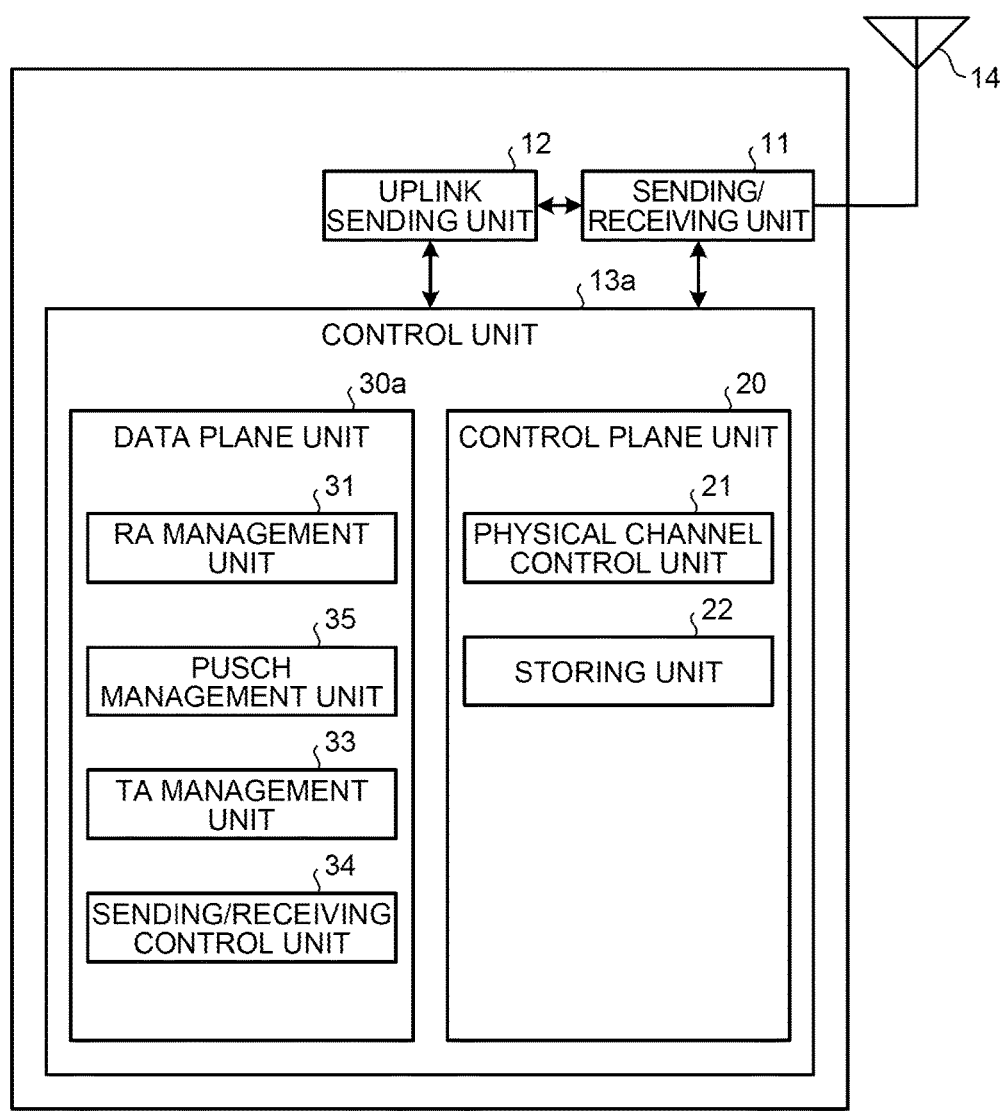
FIG. 17 is a schematic diagram illustrating an example configuration of a mobile station (sending device) in a wireless communication system according to a second embodiment.
Figure 18:
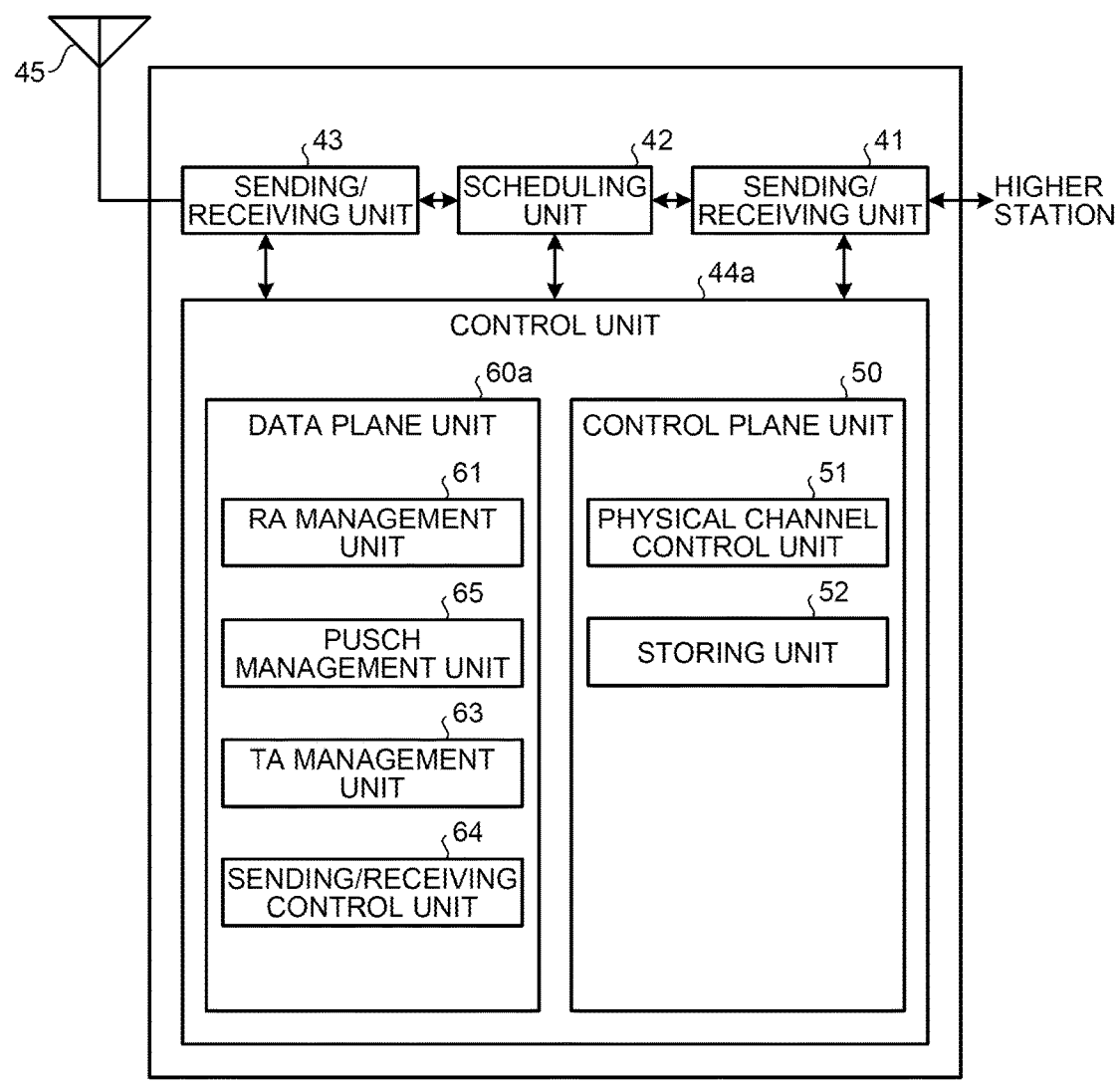
FIG. 18 is a schematic diagram illustrating an example configuration of a base station (receiving device) in the wireless communication system according to the second embodiment.

FIG. 17 is a schematic diagram illustrating an example configuration of a mobile station (sending device) in a wireless communication system. FIG. 18 is a schematic diagram illustrating an example configuration of a base station (receiving device) in the wireless communication system. Components having the same configuration as those in the mobile station and the base station in the first embodiment described above are assigned the same reference numerals; therefore, descriptions thereof in detail are omitted.

In FIG. 17, the mobile station according to the second embodiment includes a control unit 13*a* instead of the control unit 13 according to the first embodiment. A data plane unit 30*a* in the control unit 13*a* includes a PUSCH management unit 35 in addition to having the function performed by the data plane unit 30 according to the first embodiment. The PUSCH management unit 35 controls the processes related to transmitting a BSR and transmitting a shared preamble ID.

In FIG. 18, the base station according to the second embodiment includes a control unit 44*a* instead of the control unit 44 according to the first embodiment. A data plane unit 60*a* in the control unit 44*a* includes a PUSCH management unit 65 in addition to having the function performed by the data plane unit 60 according to the first embodiment. The PUSCH management unit 65 controls the processes related to receiving a BSR and related to receiving a shared preamble ID.

In the second embodiment, a description will be given, as an example, of the wireless communication method used by a wireless communication system that includes a mobile station (sending device) and a base station (receiving device); however, the relationship between the sending device and the receiving device is not limited thereto. For example, the wireless communication method according to the second embodiment may also be used in a system that includes a relay station (sending device) and a base station (receiving device) or a system that includes a mobile station (sending device) and a relay station (receiving device). Furthermore, in the example configuration of the mobile station and the base station described above, for convenience of description, components (functioning units) related to the processes according to the second embodiment are described but a description of all of the functions performed by the mobile station and the base station is not given. Furthermore, the functioning units in the mobile station and the base station can be constructed from, for example, a CPU, a FPGA, and a memory.

Figure 19:
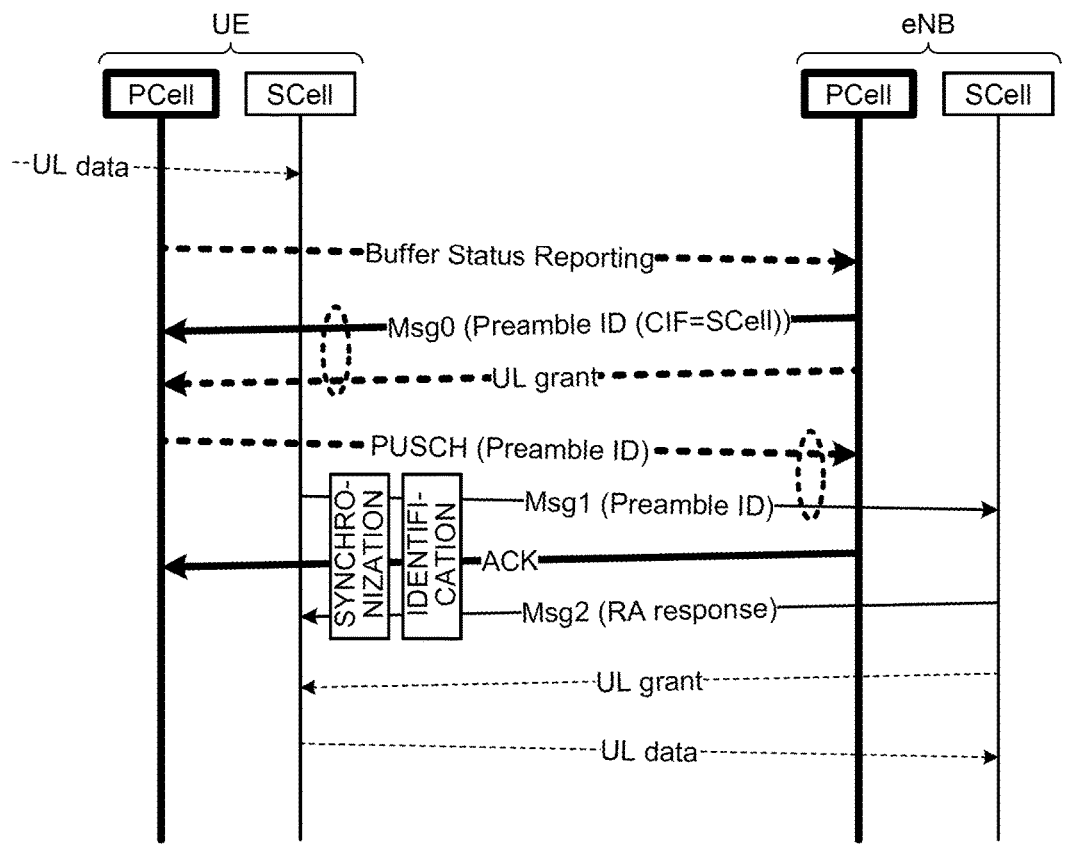
FIG. 19 is a schematic diagram illustrating an example of a wireless communication method according to the second embodiment.

In the following, the wireless communication method according to the embodiment will be described. FIG. 19 is a schematic diagram illustrating an example of a wireless communication method according to the second embodiment. In the embodiment, if uplink data is generated, the base station and the mobile station performs predetermined random access triggered when the mobile station sends a BSR. In the embodiment, it is assumed that, in a PCell, uplink synchronization is maintained and the uplink transmission resource is allocated. Furthermore, in the embodiment, it is assumed that, in an SCell, uplink synchronization is not maintained. Furthermore, in the embodiment, it is assumed that a dedicated preamble ID is insufficient and thus the base station sends the preamble ID "000000" (the Msg0 that does not include a dedicated preamble ID) via the Msg0.

In FIG. 19, if uplink data is generated and if the trigger of a buffer volume report using a BSR is generated, the mobile station sends the BSR via the PUSCH that is configured in the PCell.

Then, on the basis of the BSR (the volume of the buffer to be reported) received from the mobile station, the base station determines whether an SCell needs to be added. If it is determined that the amount of data in the uplink buffer is large and thus an SCell needs to be added, the base station sends the Msg0 to the mobile station via the PDCCH that is configured in the PCell. However, as described above, in the second embodiment, because the dedicated preamble is insufficient, "000000" is included in the Msg0 as a preamble ID. Specifically, the base station sends the Msg0 that does not contain a dedicated preamble ID to the mobile station. Furthermore, the CIF is configured in the Msg0 and a cell identifier (the identifier of an SCell that is used to transmit the Msg1) that is used to send the Msg1 is specified in this field.

Furthermore, the base station sends a UL grant (as prescribed in LTE, the "DCI format 0" is used) to the mobile station by using the subframe close to the subframe through which the Msg0 has sent. Specifically, the base station sends the Msg0 and the UL grant to the mobile station through the PCell.

In contrast, the mobile station that has received the Msg0 and the UL grant in the PCell, the mobile station starts the contention-based random access in the SCell triggered when the Msg0 and the UL grant are received. Specifically, the mobile station sends, to the base station, the Msg1 that includes the shared preamble ID that is randomly selected via the PRACH that is configured in the SCell. Furthermore, the mobile station sends the same shared preamble ID as that included in the Msg1 to the base station via the PUSCH that is configured in the PCell. At this point, the mobile station sends the shared preamble ID by using the subframe that is the same as or close to the subframe through which the Msg1 is sent. Specifically, the mobile station sends, to the base station, the Msg1 by using the SCell and the shared preamble ID by using the PCell.

In the following, the base station that has received the Msg1 through the SCell and that has received the shared preamble ID by using the PCell determines that the "the mobile station that sent the Msg1 is the same mobile station as that allocated the PUSCH resource" and then uniquely specifies the mobile station. The base station does not recognize the identifier of the active mobile station only from the Msg1; however, by receiving a shared preamble ID via the PUSCH that is configured in the PCell, the base station can identify the mobile station that has sent the Msg1. Then, after receiving the shared preamble ID by using the PCell, the base station sends back an ACK by using the PCell.

Hereinafter, in the same process as that performed in the first embodiment, the base station sends both the Msg2 and the UL grant by using the SCell, whereas the mobile station that maintained the uplink synchronization in the Msg2 receives the UL grant and then starts to exchange data with the base station (UL data).

As described above, in the second embodiment, the mobile station sends the Msg1 via the PRACH that is configured in the SCell and sends the same shared preamble ID as that included in the Msg1 via the PUSCH that is configured in the PCell. In contrast, the base station receives the Msg1 by using the SCell and the shared preamble ID by using the PCell and, by associating them, uniquely specifies the mobile station that has sent the Msg1. Consequently, the Msg3 and the Msg4 (mobile station identification process) in the conventional contention-based random access can be eliminated; therefore, it is possible to implement high-speed uplink transmission.

Similarly to the first embodiment describe above, in the wireless communication method according to the second embodiment, the time period from when the base station receives a BSR until it sends the Msg0 (the range of transmission timing) can be defined as the parameter T.

Furthermore, in the wireless communication method according to the second embodiment, the duration (the range of the transmission timing) for which the base station sends the Msg0 and the UL grant through the PCell can be defined as the parameter X (including "X=0"). The value of the parameter X is, for example, the number of subframes, where a subframe is used as a unit. In the second embodiment, as illustrated in FIG. 11 or 12, before the base station starts data communication, the base station notifies the mobile station of the value of the parameter X by using dedicated signaling.

Furthermore, in the wireless communication method according to the embodiment, the duration (the range of transmission timing) for which the mobile station sends the Msg1 (SCell) and a shared preamble ID (PCell) can be defined as the parameter Y (including "Y=0"). The value of the parameter Y is, for example, the number of subframes, where a subframe is used as a unit. In the embodiment, as illustrated in FIG. 11 or 12, before the base station starts data communication, the base station notifies the mobile station of the value of the parameter Y by using dedicated signaling.

Figure 20:
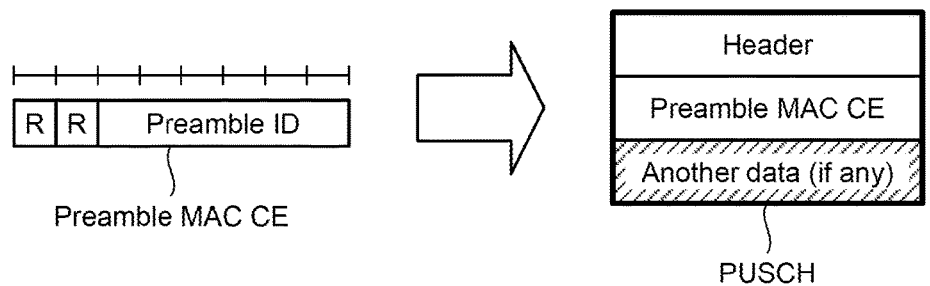
FIG. 20 is a schematic diagram illustrating a "first method" in which the mobile station sends a shared preamble ID by using a PUSCH that is configured in a PCell.
Figure 21:
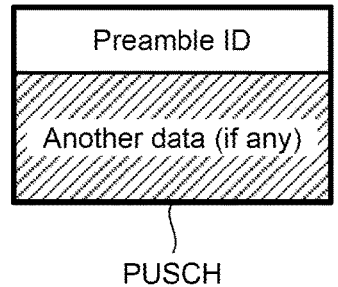
FIG. 21 is a schematic diagram illustrating a "second method" in which the mobile station sends the shared preamble ID by using the PUSCH that is configured in the PCell.

There are the following two types of method of implementing the process that "sends, by a mobile station, the same shared preamble ID as that included in the Msg1 via the PUSCH that is configured in the PCell". In the first method, a shared preamble ID is explicitly included in a PUSCH. For example, a new "MAC CE" is configured in order to send a shared preamble ID as a notification and this "MAC CE" is used for transmission. FIG. 20 is a schematic diagram illustrating the "first method", in which the mobile station sends a shared preamble ID via a PUSCH that is configured in a PCell. In the first method, the shared preamble ID included in the PUSCH can be easily detected at the base station. In the second method, a shared preamble ID is implicitly included. For example, a shared preamble ID is embedded in a PUSCH. The algorithm for embedding a shared preamble ID in a PUSCH is pre-detained in the specification. In the second method, the base station performs a receiving process under the assumption that the base station sends the Msg0 and a UL grant and then receives a shared preamble ID via the PUSCH. FIG. 21 is a schematic diagram illustrating the "second method", in which the mobile station sends the shared preamble ID by using the PUSCH that is configured in the PCell. In the second method, the signaling overhead can be reduced when compared with the first method.

Figure 22:
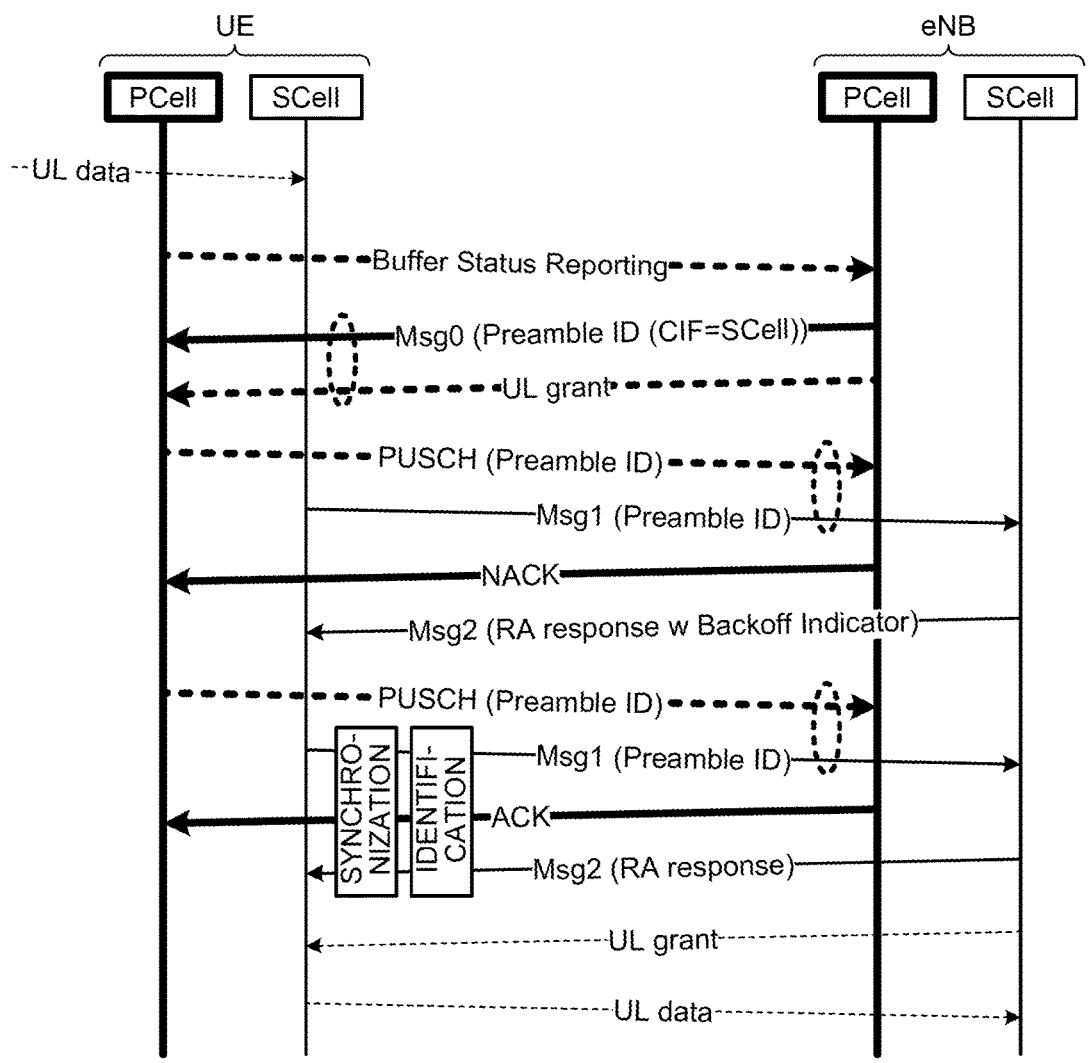
FIG. 22 is a schematic diagram illustrating an example of a case in which the base station, in a PCell, is not able to receive the shared preamble ID.

In the following, in the wireless communication method according to the second embodiment, a description will be given of a case in which a base station was not able to receive a shared preamble ID via a PUSCH that is configured in a PCell. FIG. 22 is a schematic diagram illustrating an example of a case in which the base station, in a PCell, was not able to receive a shared preamble ID. Specifically, FIG. 22 illustrates a case in which, when the mobile station sends, to the base station, the Msg1 by using the SCell and the shared preamble ID by using a PCell, the base station was not able to receive the shared preamble ID by using the PCell.

For example, if the base station has failed to receive the shared preamble ID that was sent via the PUSCH that is configured in the PCell, the base station sends a NACK by using the PCell because the base station is not able to identify the mobile station that had sent the Msg1. Furthermore, the base station sends the Msg2 that includes "Backoff Indicator" that is used to instruct resending of the shared preamble ID by using the SCell.

After the mobile station sends the Msg1 and the shared preamble ID, if the mobile station receives a NACK through the PCell and receives the Msg2 that includes the "Backoff Indicator" through the SCell, the mobile station determines that the base station had failed to receive the shared preamble ID and was not able to identify the mobile station.

Consequently, in the second embodiment, as illustrated in FIG. 22, the mobile station resends the Msg1 and the shared preamble ID. Specifically, the mobile station resends, to the base station, the Msg1 via the PRACH that is configured in the SCell and the shared preamble ID via the PUSCH that is configured in the PCell.

After that, the mobile station repeatedly resends the Msg1 and the shared preamble ID until the base station receives the ACK by using the PCell and the normal Msg2 (the Msg2 that does not include the "Backoff Indicator") by using the SCell. Then, the mobile station receives the ACK through the PCell, the normal Msg2 through the SCell, and the UL grant through the SCell, and then starts to exchange data (UL data) with the base station.

Furthermore, in FIG. 22, a description is given of a case, as an example, in which the base station sends the NACK through the PCell and the Msg2 that includes the "Backoff Indicator" through the SCell; however, the transmission of the Msg2 that includes the "Backoff Indicator" may also be omitted. In such a case, if the mobile station receives the NACK through the PCell, the mobile station determines, only from the received NACK, that the base station has failed to receive the shared preamble ID.

Figure 23:
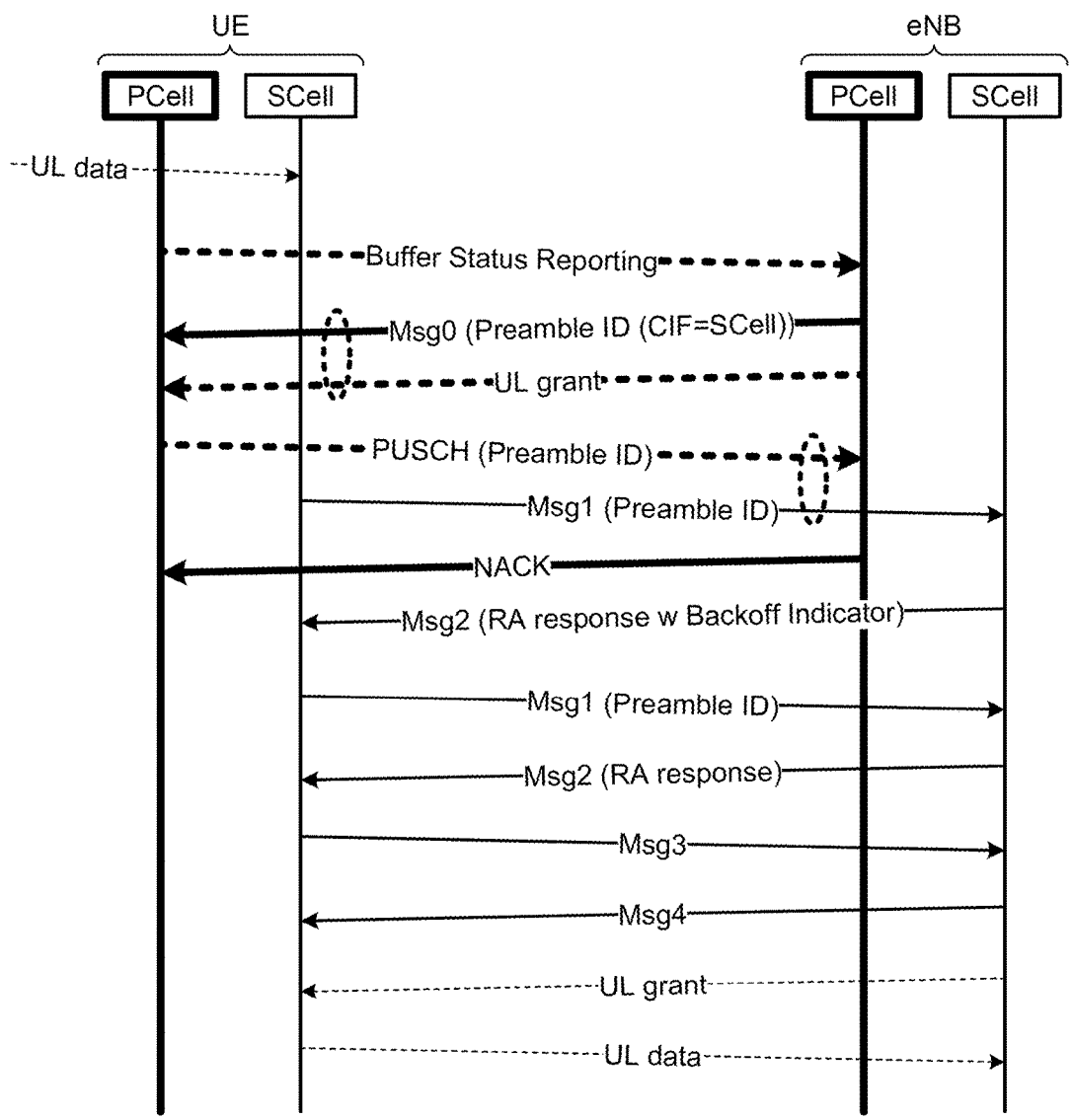
FIG. 23 is a schematic diagram illustrating an example of a case in which the base station, in a PCell, is not able to receive the shared preamble ID.

Similarly to FIG. 22, FIG. 23 is a schematic diagram illustrating an example of a case in which the base station, in a PCell, was not able to receive the shared preamble ID. However, data exchange between the mobile station and the base station is implemented by a process that is different from that illustrated in FIG. 22. In the following, a description will be given of a process that is different from that illustrated in FIG. 22.

After the mobile station sent the Msg1 and the shared preamble ID, if the mobile station receives the NACK through the PCell and receives the Msg2 that includes the "Backoff Indicator" through the SCell, the mobile station determines that the base station had failed to receive the shared preamble ID and was not able to identify the mobile station. At this point, in FIG. 23, the mobile station starts the contention-based random access illustrated in FIG. 5. Specifically, if the base station has failed to receive the shared preamble ID that was sent via the PUSCH that is configured in the PCell, the mobile station and the base station perform the process on the Msg1 to the Msg4 by using contention-based random access in the SCell. Then, the mobile station receives the Msg4 by using the SCell from the base station, receives the UL grant by using the SCell, and then starts to exchange data (UL data) with the base station.

Furthermore, in the second embodiment, the operation performed when the base station was not able to receive the shared preamble ID via the PUSCH that is configured in the PCell has been described as an example by using FIG. 22 and FIG. 23; however, the operation is not limited thereto. For example, the operations illustrated in FIGS. 22 and 23 may also be used in combination. Specifically, the maximum number of times a resend is performed, as illustrated in FIG. 22, is predetermined, and if the number of times a resend is performed reaches the maximum number of times a resend is performed, the contention-based random access (the Msg1 to the Msg4) illustrated in FIG. 23 may also be performed.

Figure 24:
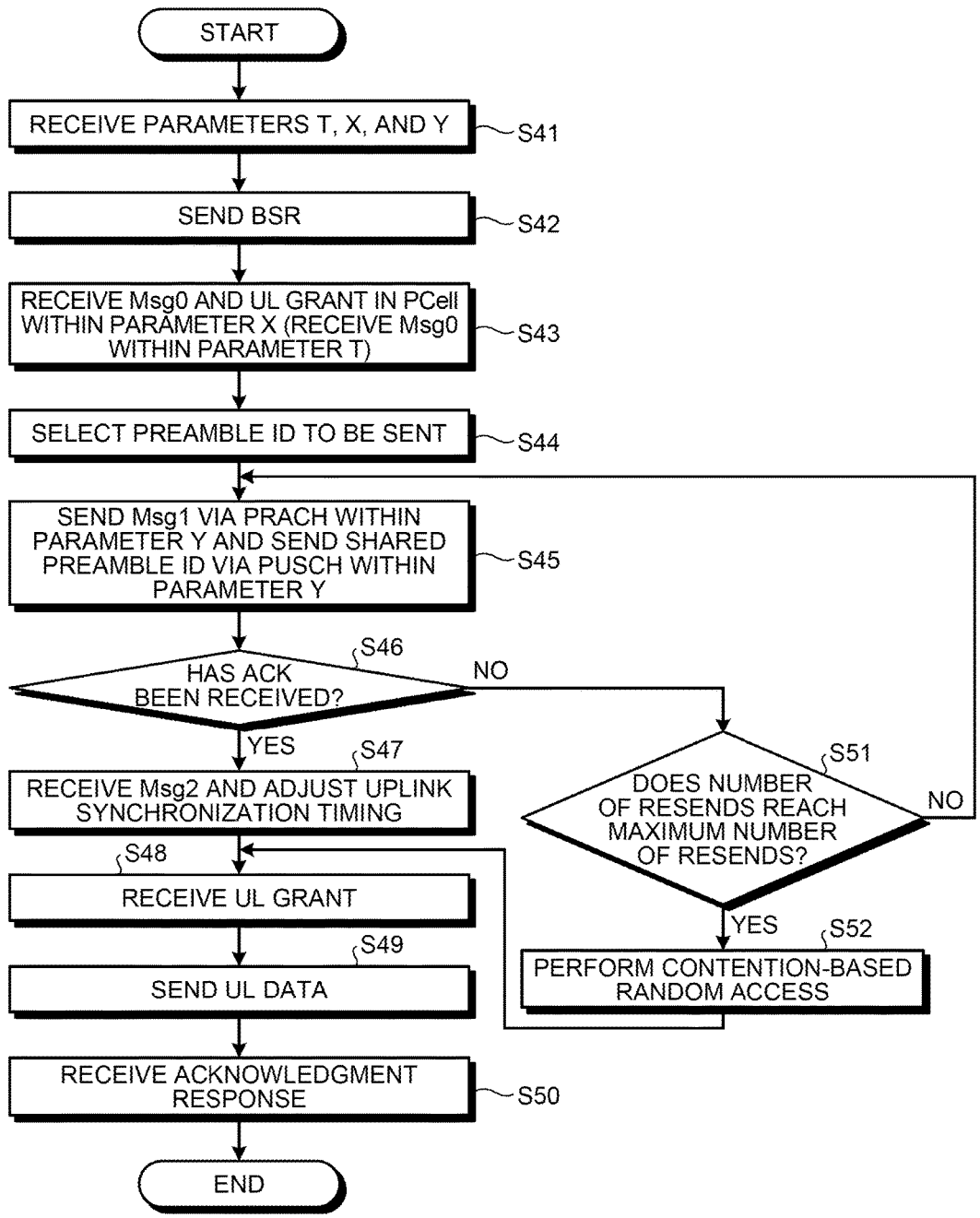
FIG. 24 is a flowchart illustrating the operation of the mobile station (sending device) that sends UL data.
Figure 25:
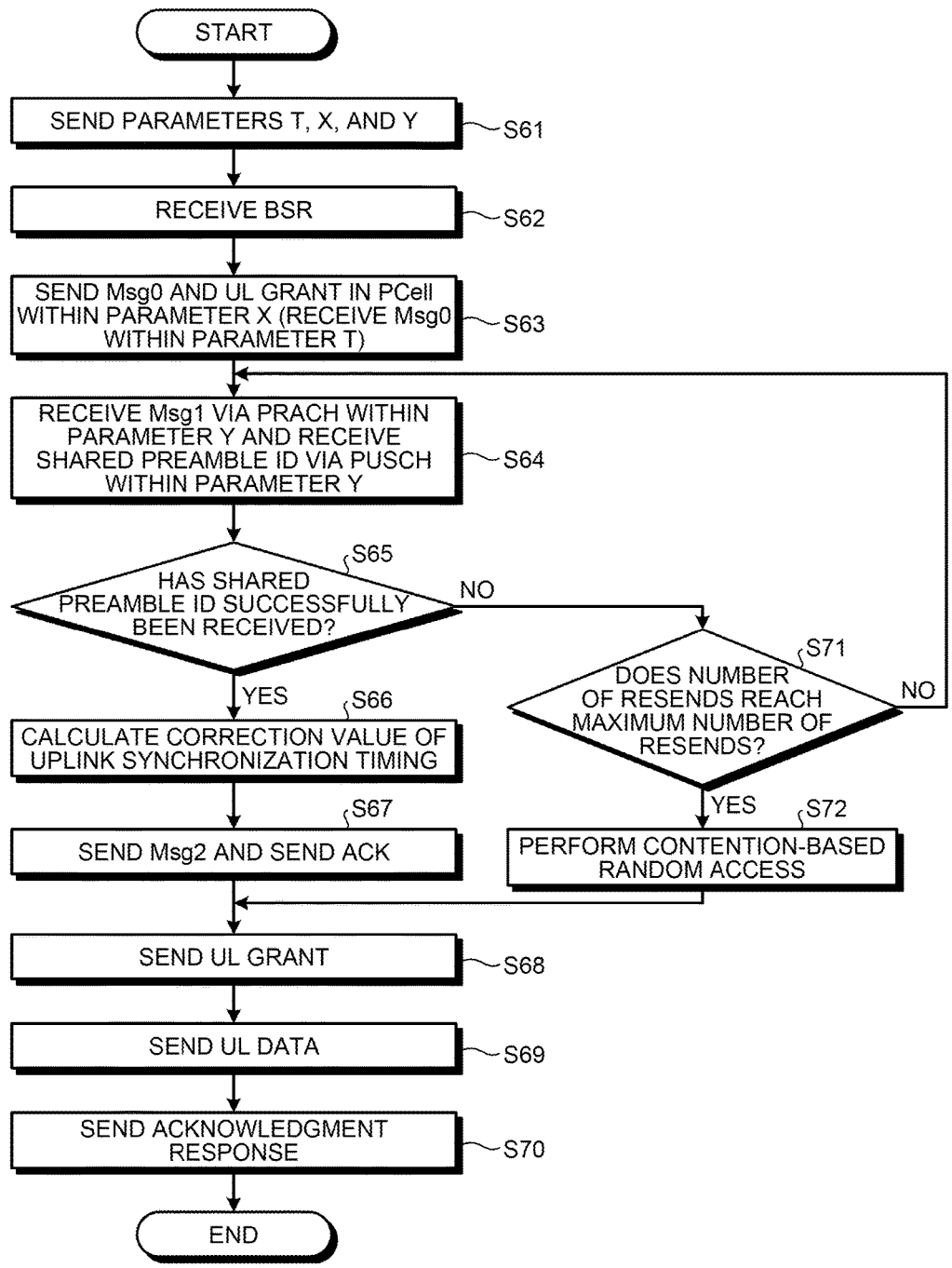
FIG. 25 is a flowchart illustrating the operation of the base station (receiving device) that receives the UL data.

In the following, the operation of the base station and the mobile station that implements the wireless communication method according to the second embodiment will be described in accordance with a flowchart. FIG. 24 is a flowchart illustrating the operation of the mobile station (sending device) that sends UL data. FIG. 25 is a flowchart illustrating the operation of the base station (receiving device) that receives the UL data. In the second embodiment, a description will be given with the assumption that, in an SCell, uplink synchronization is not maintained. Furthermore, in the second embodiment, a description will be given with the assumption that, a dedicated preamble ID is insufficient and thus the base station sends the preamble ID "000000" by using the Msg0.

The operation of the mobile station will be described with reference to FIG. 24. First, the sending/receiving control unit 34 receives the parameters T, X, and Y that are sent via the sending/receiving unit 11 using the "RRC Connection Reconfiguration" and stores the parameters in the storing unit 22 (Step S41). Then, if UL data is generated, the PUSCH management unit 35 sends a BSR via the PUSCH configured in the PCell via the uplink sending unit 12 and the sending/receiving unit 11 (Step S42). Although not illustrated because it is assumed that the uplink synchronization of the SCell is not maintained, in practice, the TA management unit 33 determines whether uplink synchronization of the SCell is maintained at a predetermined timing before sending the BSR.

Then, the RA management unit 31 receives, via the sending/receiving unit 11, the Msg0 via the PDCCH that is configured in the PCell (Step S43). At this point, the RA management unit 31 receives, within the parameter T, the Msg0 in which the CIF is configured. Furthermore, the RA management unit 31 receives, via the sending/receiving unit 11, the UL grant in the subframe in the PCell close to the subframe (within the parameter X) that has received the Msg0 (Step S43).

Then, the RA management unit 31 randomly selects a shared preamble ID (Step S44) and then sends the Msg1 that includes the selected shared preamble ID via the uplink sending unit 12 and the sending/receiving unit 11 via the PRACH that is configured in the SCell that is specified by the CIF (Step S45). Consequently, the mobile station starts contention-based random access. Furthermore, the PUSCH management unit 35 sends, via the uplink sending unit 12 and the sending/receiving unit 11, the same shared preamble ID as that included in the Msg1 by using the PUSCH that is configured in the PCell (Step S45). At this point, the PUSCH management unit 35 sends the shared preamble ID by using the subframe that is the same as or close to the subframe (within the parameter Y) through which the Msg1 is sent.

Then, the PUSCH management unit 35 checks an acknowledgment response (ACK/NACK) that is sent via the sending/receiving unit 11 by using the PCell (Step S46). For example, if the acknowledgment response is an ACK (Yes at Step S46), the RA management unit 31 receives the Msg2 in the SCell via the sending/receiving unit 11 (Step S47). Then, the TA management unit 33 adjusts the uplink synchronization timing on the basis of the Msg2 that was received by the RA management unit 31 (Step S47).

Furthermore, after the RA management unit 31 receives the Msg2, the sending/receiving control unit 34 receives a UL grant in the SCell via the sending/receiving unit 11 (Step S48). Then, the sending/receiving control unit 34 sends the UL data in the SCell via the uplink sending unit 12 and the sending/receiving unit 11 (Step S49) and receives an acknowledgment response (ACK/NACK) in the SCell in response thereto (Step S50).

In contrast, if the PUSCH management unit 35 receives a NACK in the PCell at Step S46 (No at Step S46), the PUSCH management unit 35 determines whether the number of times a resend is performed of the shared preamble ID reaches a predetermined maximum number of times a resend is performed (Step S51). For example, if the number of times a resend is performed of the shared preamble ID is less than the maximum number of times a resend is performed (No at Step S51), the RA management unit 31 and the PUSCH management unit 35 perform the process at Step S45 again. Specifically, the RA management unit 31 sends the Msg1 that includes the shared preamble ID via the PRACH that is configured in the SCell and the PUSCH management unit 35 sends the shared preamble ID via the PUSCH that is configured in the PCell (Step S45).

Furthermore, in the process performed at Step S51, the number of times a resend is performed of the shared preamble ID reaches the predetermined maximum of times a resend is performed (Yes at Step S51), the RA management unit 31 performs the contention-based random access illustrated in FIG. 5 (Step S52). Then, after receiving the UL grant in the SCell via the sending/receiving unit 11 (Step S48), the sending/receiving control unit 34 sends the UL data by using the SCell via the uplink sending unit 12 and the sending/receiving unit 11 (Step S49).

In the following, the operation of the base station will be described with reference to FIG. 25. First, the sending/receiving control unit 64 reads the parameters T, X, and Y that are previously stored in the storing unit 52 and sends the parameters via the sending/receiving unit 43 by using the "RRC Connection Reconfiguration" (Step S61). Then, if UL data is generated in the mobile station, the PUSCH management unit 65 receives a BSR via the sending/receiving unit 43 via the PUSCH that is configured in the PCell (Step S62).

Then, the RA management unit 61 sends the Msg0 via the sending/receiving unit 43 via the PDCCH that is configured in the PCell (Step S63). At this point, the RA management unit 61 sends, within the parameter T, the Msg0 in which the CIF is configured. Furthermore, the RA management unit 61 sends the UL grant via the sending/receiving unit 43 by using the subframe in the PCell close to the subframe (within the parameter X) through which the Msg0 is sent (Step S63).

Then, the RA management unit 61 receives the Msg1 that includes the shared preamble ID via the sending/receiving unit 43 by using the PRACH that is configured in the SCell specified by the CIF (Step S64). Furthermore, the PUSCH management unit 65 performs the process of receiving the same shared preamble ID as that included in the Msg1 by using the PUSCH that is configured in the PCell (Step S64). At this point, the PUSCH management unit 65 performs the process of receiving the shared preamble ID in the same or close to (within Y) the subframe through which the Msg1 is included.

Then, if the PUSCH management unit 65 successfully performs the process of receiving the shared preamble ID (Yes at Step S65), the PUSCH management unit 65 determines that "the mobile station that has sent the Msg1 is the same mobile station as that that allocates the PUSCH resource" and then uniquely specifies the mobile station that has sent the Msg1. Then, the TA management unit 63 calculates the value of the uplink synchronization timing correction associated with the mobile station that has sent the Msg1 (Step S66).

Then, the PUSCH management unit 65 sends an ACK through the PCell via the sending/receiving unit 43 (Step S67). Furthermore, the RA management unit 61 sends, via the sending/receiving unit 43, the Msg2 that includes the value of the uplink synchronization timing correction by using the SCell (Step S67).

Furthermore, after the RA management unit 61 sent the Msg2, the sending/receiving control unit 64 sends the UL grant via the sending/receiving unit 43 by using the SCell (Step S68). Then, the sending/receiving control unit 64 receives the UL data via the sending/receiving unit 43 by using the SCell (Step S69) and sends back the acknowledgment response (ACK/NACK) by using the SCell as a response thereto (Step S70).

In contrast, if the PUSCH management unit 65 has failed to receive the shared preamble ID at the process performed at Step S65 (No at Step S65), the PUSCH management unit 65 determines whether the number of times a resend is performed of the shared preamble ID reaches the maximum number of times a resend is performed (Step S71). For example, if the number of times a resend is performed of the shared preamble ID does not reach the maximum number of times a resend is performed (No at Step S71), the RA management unit 61 and the PUSCH management unit 65 performs the process at Step S64 again. Specifically, the RA management unit 61 receives the Msg1 that includes the shared preamble ID via the PRACH that is configured in the SCell and the PUSCH management unit 65 receives the shared preamble ID via the PUSCH that is configured in the PCell (Step S64).

Furthermore, in the process performed at Step S71, if the number of times a resend is performed of the shared preamble ID reaches the predetermined maximum number of times a resend is performed (Yes at Step S71), the RA management unit 61 performs the contention-based random access illustrated in FIG. 5 (Step S72). Then, after sending the UL grant by using the SCell via the sending/receiving unit 43 (Step S68), the sending/receiving control unit 64 receives the UL data by using the SCell via the sending/receiving unit 43 (Step S69).

In the processes performed at Steps S41 and S61 described above by using the flowcharts, the parameters are sent and received using the "RRC Connection Reconfiguration"; however, the method is not limited thereto. For example, the parameters may also be sent and received by using the "MAC Control Element".

As described above, in the second embodiment, if uplink data is generated, a mobile station sends a BSR, and, if the base station determines that an SCell needs to be added in response to the report of the BSR, the base station and the mobile station perform contention-based random access. At this point, the mobile station sends the Msg1 via the PRACH that is configured in the SCell and also sends the same shared preamble ID as that included in the Msg1 via the PUSCH that is configured in the PCell. Then, the base station determines that "the mobile station that has sent the Msg1 is the same mobile station as that that allocates the PUSCH resource" and then uniquely specifies the mobile station that has sent the Msg1. Consequently, the Msg3 and the Msg4 (mobile station identification process) performed in the contention-based random access can be omitted; therefore, it is possible to reduce the time needed for the synchronization maintenance. In other words, high-speed communication can be implemented as the entirety of the system.

Figure 26:
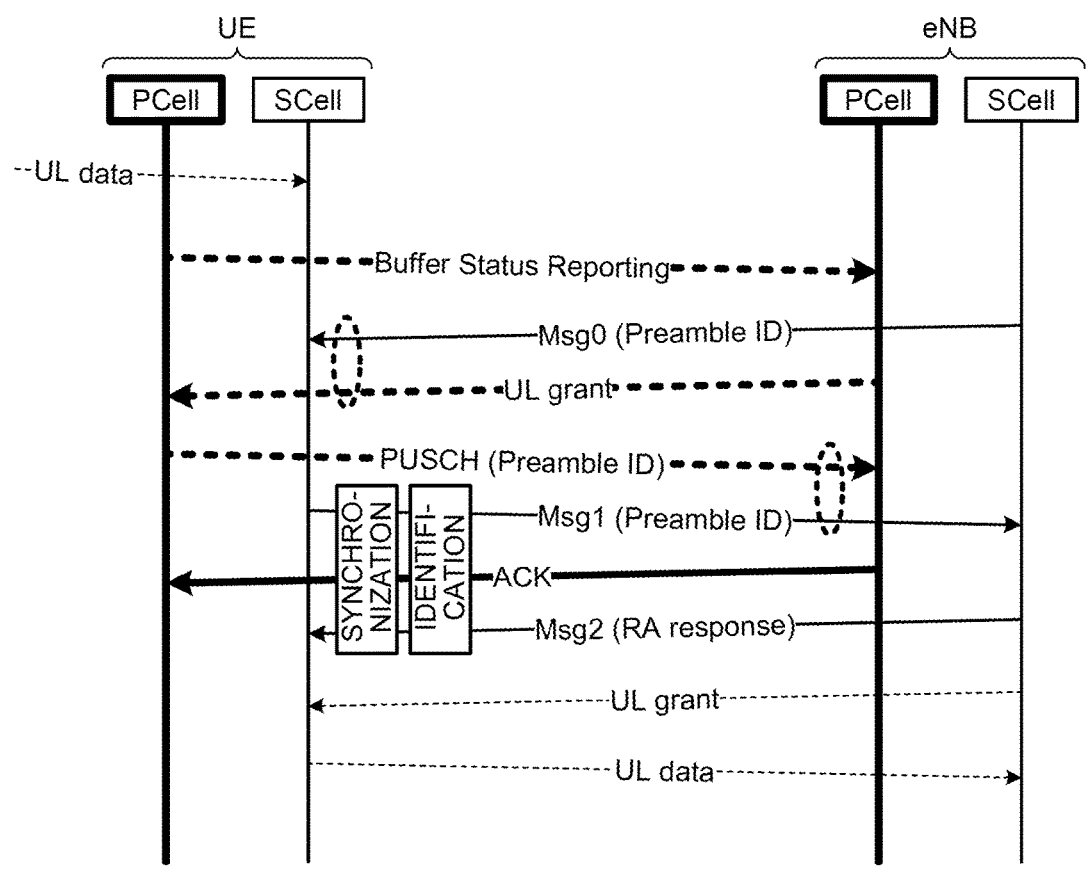
FIG. 26 is a schematic diagram illustrating a wireless communication method according to the second embodiment used when an Msg0 is sent from an SCell.

In the second embodiment, the Msg0 is sent to the mobile station via the PDCCH that is configured in the PCell; however, the method is not limited thereto. For example, the Msg0 may also be sent by using the SCell. FIG. 26 is a schematic diagram illustrating a wireless communication method according to the second embodiment used when an Msg0 is sent from an SCell. In FIG. 26, the base station determines, on the basis of the BSR received from the mobile station, whether a SCell needs to be added. If it is determined that an SCell needs to be added, the Msg0 is sent through the SCell. In such a case, because the Msg0 is sent through the SCell, there is no need to configure the CIF. Furthermore, because the mobile station receives the Msg0 through the SCell after sending a BSR, the mobile station makes the state of the SCell active. Consequently, the mobile station can perform contention-based random access by using the SCell through which the Msg0 has been received.

According to an aspect of an embodiment of a wireless communication system, an advantage is provided in that it is possible to speed up communication.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

Notes

The embodiments described above may be implemented according to the following notes.

Note 1

A wireless communication system that is enabled to perform wireless communication by using multiple wireless carriers, wherein a sending device includes a first control unit that sends the state of a buffer by using a first wireless carrier, and a first random access management unit that manages random access performed by the sending device, a receiving device includes a second control unit that receives the state of the buffer by using the first wireless carrier and that performs a data exchange by using a second wireless carrier on the basis of the state of the buffer, and a second random access management unit that manages random access performed by the receiving device, when the second control unit performs the data exchange by using the second wireless carrier, the second random access management unit sends control information that includes a dedicated preamble that is unique to a device, and as a trigger when the control information is exchanged, the first and the second random access management units perform, by using the second wireless carrier, non-contention based random access that uses the dedicated preamble.

Note 2

The wireless communication system according to note 1, wherein the second random access management unit sends the control information that includes the dedicated preamble by using the first wireless carrier.

Note 3

The wireless communication system according to note 2, wherein the second random access management unit includes, in the control information, identification information that is used to identify the second wireless carrier.

Note 4

The wireless communication system according to note 1, wherein, when the resource for sending the state of the buffer is not allocated in the first wireless carrier, the sending device sends a data transmission grant request message to the receiving device and receives, as a response to the message, a data transmission grant message from the receiving device, and the first control unit sends the state of the buffer after the first control unit receives the data transmission grant message.

Note 5

The wireless communication system according to note 1, wherein the second random access management unit sends, by using the second wireless carrier, the control information that includes the dedicated preamble.

Note 6

The wireless communication system according to note 5, wherein, after the first control unit sends the state of the buffer, the sending device activates the second wireless carrier in order to receive the control information.

Note 7

The wireless communication system according to note 1, wherein when the second control unit performs the data exchange by using the second wireless carrier and when the number of dedicated preambles is insufficient, the second random access management unit sends control information that includes an empty preamble, in the sending device, as a trigger when the control information is received, the first random access management unit sends a randomly selected shared preamble by using the second wireless carrier to start contention-based random access, and furthermore, the first control unit sends the shared preamble by using the first wireless carrier, the receiving device associates a shared preamble received by the second random access management unit by using the second wireless carrier with a shared preamble received by the second control unit by using the first wireless carrier to identify the sending device that has sent the shared preamble, and the sending device starts to send data to the receiving device after synchronization of the second wireless carrier is maintained due to the execution of the contention-based random access.

Note 8

The wireless communication system according to note 7, wherein the first control unit sends the shared preamble by using a shared channel that is configured in the first wireless carrier.

Note 9

The wireless communication system according to note 7, wherein the first control unit sends a shared preamble by using a subframe that is a predetermined number of subframes after a subframe through which the first random access management unit sends the shared preamble.

Note 10

The wireless communication system according to note 7, wherein, when the second control unit has failed to receive the shared preamble that is sent by using the first wireless carrier, the first random access management unit in the sending device repeatedly sends the shared preamble and the first control unit in the sending device repeatedly sends the shared preamble until the second control unit receives the shared preamble.

Note 11

The wireless communication system according to note 1, wherein when wireless communication is performed using carrier aggregation, the first wireless carrier is used as a primary cell, and the second wireless carrier is used as a secondary cell.

Note 12

A wireless communication system that is enabled to perform wireless communication by using multiple wireless carriers, wherein a sending device includes a first control unit that sends the state of a buffer by using a first wireless carrier, and a first random access management unit that manages random access performed by the sending device, a receiving device includes a second control unit that receives the state of the buffer by using the first wireless carrier and that performs a data exchange by using a second wireless carrier on the basis of the state of the buffer, and a second random access management unit that manages random access performed by the receiving device, when the second control unit performs the data exchange by using the second wireless carrier, the second random access management unit sends control information that includes an empty preamble, in the sending device, as a trigger when the control information is received, the first random access management unit sends a randomly selected shared preamble by using the second wireless carrier to start contention-based random access, and furthermore, the first control unit sends the shared preamble by using the first wireless carrier, the receiving device associates a shared preamble received by the second random access management unit by using the second wireless carrier with a shared preamble received by the second control unit by using the first wireless carrier to identify the sending device that has sent the shared preamble, and the sending device starts to send data to the receiving device after synchronization of the second wireless carrier is maintained due to the execution of the contention-based random access.

Note 13

The wireless communication system according to note 12, wherein the first control unit sends the shared preamble by using a shared channel that is configured in the first wireless carrier.

Note 14

The wireless communication system according to note 12, wherein the first control unit sends a shared preamble by using a subframe that is a predetermined number of subframes after a subframe through which the first random access management unit sends the shared preamble.

Note 15

The wireless communication system according to note 12, wherein, when the second control unit has failed to receive the shared preamble that is sent by using the first wireless carrier, the first random access management unit in the sending device repeatedly sends the shared preamble and the first control unit in the sending device repeatedly sends the shared preamble until the second control unit receives the shared preamble.

Note 16

The wireless communication system according to note 12, wherein when wireless communication is performed using carrier aggregation, the first wireless carrier is used as a primary cell, and the second wireless carrier is used as a secondary cell.

Note 17

A receiving device that is enabled to receive data by using multiple wireless carriers comprising:

a control unit that receives the state of a buffer from a sending device by using a first wireless carrier and that performs a data exchange by using a second wireless carrier on the basis of the state of the buffer; and a random access management unit that sends, when the control unit performs the data exchange by using a second wireless carrier, control information that includes a dedicated preamble that is unique to a device.

Note 18

The receiving device according to note 17, wherein the random access management unit sends the control information that includes the dedicated preamble by using the first wireless carrier.

Note 19

The receiving device according to note 17, wherein the random access management unit sends the control information that includes the dedicated preamble by using the second wireless carrier.

Note 20

The receiving device according to note 17, wherein when the control unit performs the data exchange by using the second wireless carrier and when the number of dedicated preambles is insufficient, the random access management unit sends control information that includes an empty preamble, and as a trigger when the control information is received, when the sending device sends a randomly selected shared preamble by using the second wireless carrier and furthermore sends the randomly selected shared preamble by using the first wireless carrier, the random access management unit associates a shared preamble received by using the second wireless carrier with a shared preamble received by the control unit by using the first wireless carrier to identify the sending device that has sent the shared preamble.

Note 21

A receiving device that is enabled to receive data by using multiple wireless carrier comprising:

a control unit that receives the state of a buffer by using a first wireless carrier and that performs a data exchange by using a second wireless carrier on the basis of the state of the buffer; and a random access management unit that manages random access performed by the receiving device, wherein when the control unit performs the data exchange by using the second wireless carrier, the random access management unit sends control information that includes an empty preamble, as a trigger when the control information is received, when the sending device sends a randomly selected shared preamble by using the second wireless carrier and furthermore sends the randomly selected shared preamble by using the first wireless carrier, the random access management unit associates a shared preamble received by using the second wireless carrier with a shared preamble received by the control unit by using the first wireless carrier to identify the sending device that has sent the shared preamble.

Note 22

A sending device that is enabled to send data by using multiple wireless carriers comprising:

a control unit that sends the state of a buffer by using a first wireless carrier; and a random access management unit that manages random access performed by the sending device, wherein as a trigger when the control information is received, when a receiving device performs a data exchange by using a second wireless carrier on the basis of the state of the buffer and sends control information that includes a dedicated preamble that is unique to a device, the random access management unit performs, by using the second wireless carrier, non-contention based random access that uses the dedicated preamble.

Note 23

The sending device according to note 22, wherein the random access management unit receives the control information that includes the dedicated preamble by using the first wireless carrier.

Note 24

The sending device according to note 22, wherein the random access management unit receives the control information that includes the dedicated preamble by using the second wireless carrier.

Note 25

The sending device according to note 22, wherein, when the receiving device performs the data exchange by using the second wireless carrier and sends control information that includes an empty preamble, the random access management unit sends, as a trigger when the control information is received, a randomly selected shared preamble by using the second wireless carrier, and furthermore, the control unit sends the randomly selected shared preamble by using the first wireless carrier.

Note 26

The sending device according to note 25, wherein the control unit sends the shared preamble by using a shared channel that is configured in the first wireless carrier.

Note 27

The sending device according to note 25, wherein, when the receiving device has failed to receive the shared preamble that is sent by using the first wireless carrier, the random access management unit repeatedly sends the shared preamble and the control unit repeatedly sends the shared preamble until the receiving device receives the shared preamble.

Note 28

A sending device that is enabled to send data by using multiple wireless carriers comprising:

a control unit that sends the state of a buffer by using a first wireless carrier; and a random access management unit that manages random access performed by the sending device, wherein when a receiving device performs a data exchange by using a second wireless carrier and sends control information that includes an empty preamble, the random access management unit sends, as a trigger when the control information is received, a randomly selected shared preamble by using the second wireless carrier, and furthermore, the control unit sends the shared preamble by using the first wireless carrier.

Note 29

The sending device according to note 28, wherein the control unit sends the shared preamble by using a shared channel that is configured in the first wireless carrier.

Note 30

The sending device according to note 28, wherein, when the receiving device has failed to receive the shared preamble that is sent by using the first wireless carrier, the random access management unit repeatedly sends the shared preamble and the control unit repeatedly sends the shared preamble until the receiving device receives the shared preamble.

Note 31

A wireless communication method performed in a wireless communication system that is enabled to perform wireless communication by using multiple wireless carriers, the wireless communication method comprising:

sending, performed by a sending device, the state of a buffer by using a first wireless carrier;

receiving, performed by a receiving device, the state of the buffer by using the first wireless carrier;

sending, performed by a receiving device when performing a data exchange by using a second wireless carrier on the basis of the state of the buffer, control information that includes a dedicated preamble that is unique to a device; and performing, by the sending device and the receiving device as a trigger when the control information is exchanged, non-contention based random access by using the second wireless carrier by using the dedicated preamble.

Note 32

The wireless communication method according to note 31, wherein the sending includes sending, performed by the receiving device, control information that includes an empty preamble when performing the data exchange by using the second wireless carrier and when the number of dedicated preambles is insufficient, wherein the wireless communication method further comprises starting, performed by the sending device as a trigger when the control information is received, contention-based random access by sending a randomly selected shared preamble by using the second wireless carrier, wherein the sending includes sending, performed by the sending device, the shared preamble by using the first wireless carrier, wherein the wireless communication method further comprises identifying, performed by the receiving device, the sending device that sent the shared preamble by associating the shared preamble received by using the second wireless carrier with the shared preamble received by using the first wireless carrier, and wherein the starting includes starting, performed by the sending device, to send data to the receiving device after synchronization of the second wireless carrier is maintained due to the execution of the contention-based random access.

Note 33

A wireless communication method performed in a wireless communication system that is enabled to perform wireless communication by using multiple wireless carrier, the wireless communication method comprising:

sending, performed by a sending device, the state of a buffer by using a first wireless carrier;

receiving, performed by a receiving device, the state of the buffer by using the first wireless carrier;

sending, performed by a receiving device when performing a data exchange by using the second wireless carrier on the basis of the state of the buffer, control information that includes an empty preamble;

starting, performed by the sending device as a trigger when the control information is received, contention-based random access by sending a randomly selected shared preamble by using the second wireless carrier, wherein the sending includes sending, performed by the sending device, the shared preamble by using the first wireless carrier, wherein the wireless communication method further comprises identifying, performed by the receiving device, the sending device that has sent the shared preamble by associating the shared preamble received by using the second wireless carrier with the shared preamble received by using the first wireless carrier; and wherein the starting includes starting, performed by the sending device, to send data to the receiving device after synchronization of the second wireless carrier is maintained due to the execution of the contention-based random access.

What is claimed is:

1. A wireless communication system that is enabled to perform wireless communication by using multiple wireless carriers, wherein a sending device includes a first processor, coupled to a first memory, that performs a first process including:
  sending the state of a buffer by using a first wireless carrier, and
  performing first random access, a receiving device includes a second processor, coupled to a second memory, that performs a second process including:
  receiving the state of the buffer by using the first wireless carrier and performing a data exchange by using a second wireless carrier on the basis of the state of the buffer, and
  performing second random access, when the data exchange is performed by using the second wireless carrier, the performing the second random access includes sending, by using the first wireless carrier, control information that includes a dedicated preamble that is unique to a device after a predetermined time period from the time when the state of the buffer is received, the predetermined time period being shared between the receiving device and the sending device by using a dedicated signaling by which the receiving device notifies the sending device of a parameter indicating a length of the predetermined time, as a trigger when the control information is exchanged, the performing the first random access and the performing the second random access include performing, by using the second wireless carrier specified in the control information received by using the first wireless carrier, non-contention based random access that uses the dedicated preamble, and the dedicated signaling is a Radio Resource Control (RRC) signaling.

2. The wireless communication system according to claim 1, wherein the performing the second random access includes sending the control information that includes the dedicated preamble by using the first wireless carrier.

3. The wireless communication system according to claim 1, wherein, when the resource for sending the state of the buffer is not allocated in the first wireless carrier, the sending device sends a data transmission grant request message to the receiving device and receives, as a response to the message, a data transmission grant message from the receiving device, and the sending the state of the buffer includes sending the state of the buffer after the data transmission grant message is received.

4. The wireless communication system according to claim 1, wherein the performing the second random access includes sending, by using the second wireless carrier, the control information that includes the dedicated preamble.

5. The wireless communication system according to claim 1, wherein when the data exchange is performed by using the second wireless carrier and when the number of dedicated preambles is insufficient, the performing the second random access includes sending control information that includes an empty preamble, in the sending device, as a trigger when the control information is received, the performing the first random access includes sending a randomly selected shared preamble by using the second wireless carrier to start contention-based random access, and furthermore, the sending the state of the buffer includes sending the shared preamble by using the first wireless carrier, the receiving device associates a shared preamble received at the performing the second random access by using the second wireless carrier with a shared preamble received at the receiving the state of the buffer by using the first wireless carrier to identify the sending device that has sent the shared preamble, and the sending device starts to send data to the receiving device after synchronization of the second wireless carrier is maintained due to the execution of the contention-based random access.

6. A receiving device that is enabled to receive data by using multiple wireless carriers comprising a processor, coupled to a memory, that performs a process including:

receiving the state of a buffer from a sending device by using a first wireless carrier and performing a data exchange by using a second wireless carrier on the basis of the state of the buffer; and sending, by using the first wireless carrier, when the data exchange is performed by using a second wireless carrier, control information that includes a dedicated preamble that is unique to a device after a predetermined time period from the time when the state of the buffer is received, the predetermined time period being shared between the receiving device and the sending device by using a dedicated signaling by which the receiving device notifies the sending device of a parameter indicating a length of the predetermined time, wherein the dedicated signaling is a Radio Resource Control (RRC) signaling.

7. The receiving device according to claim 6, wherein the sending includes sending the control information that includes the dedicated preamble by using the first wireless carrier.

8. The receiving device according to claim 6, wherein the sending includes sending the control information that includes the dedicated preamble by using the second wireless carrier.

9. The receiving device according to claim 6, wherein when the data exchange is performed by using the second wireless carrier and when the number of dedicated preambles is insufficient, the sending includes sending control information that includes an empty preamble, and as a trigger when the control information is received, when the sending device sends a randomly selected shared preamble by using the second wireless carrier and furthermore sends the randomly selected shared preamble by using the first wireless carrier, the sending includes associating a shared preamble received by using the second wireless carrier with a shared preamble received at the receiving by using the first wireless carrier to identify the sending device that has sent the shared preamble.

10. A sending device that is enabled to send data by using multiple wireless carriers comprising a processor, coupled to a memory, that performs a process including:

sending the state of a buffer by using a first wireless carrier; and performing random access, wherein as a trigger when control information is received, when a receiving device receives the state of the buffer by using the first wireless carrier, performs a data exchange by using a second wireless carrier on the basis of the state of the buffer, and sends, by using the first wireless carrier, the control information that includes a dedicated preamble that is unique to a device after a predetermined time period from the time when the state of the buffer is received, the predetermined time period being shared between the receiving device and the sending device by using a dedicated signaling by which the receiving device notifies the sending device of a parameter indicating a length of the predetermined time, the performing the random access includes performing, by using the second wireless carrier specified in the control information received by using the first wireless carrier, non-contention based random access that uses the dedicated preamble, and the dedicated signaling is a Radio Resource Control (RRC) signaling.

11. The sending device according to claim 10, wherein the performing the random access includes receiving the control information that includes the dedicated preamble by using the first wireless carrier.

12. The sending device according to claim 10, wherein the performing the random access includes receiving the control information that includes the dedicated preamble by using the second wireless carrier.

13. The sending device according to claim 10, wherein, when the receiving device performs the data exchange by using the second wireless carrier and sends control information that includes an empty preamble, the performing the random access includes sending, as a trigger when the control information is received, a randomly selected shared preamble by using the second wireless carrier, and furthermore, the sending includes sending the randomly selected shared preamble by using the first wireless carrier.

* * * * *